(12) United States Patent
Sato et al.

(10) Patent No.: US 9,133,954 B2
(45) Date of Patent: Sep. 15, 2015

(54) ELECTROMAGNETIC LINEAR VALVE

(75) Inventors: Kei Sato, Kasugai (JP); Masaki Nanahara, Toyota (JP); Masayasu Ohkubo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 13/811,839

(22) PCT Filed: Sep. 6, 2010

(86) PCT No.: PCT/JP2010/065232
§ 371 (c)(1),
(2), (4) Date: Jan. 23, 2013

(87) PCT Pub. No.: WO2012/032594
PCT Pub. Date: Mar. 15, 2012

(65) Prior Publication Data
US 2013/0153801 A1    Jun. 20, 2013

(51) Int. Cl.
*F16K 31/06* (2006.01)

(52) U.S. Cl.
CPC .............. *F16K 31/06* (2013.01); *F16K 31/0655* (2013.01); *F16K 31/0658* (2013.01); *F16K 31/0665* (2013.01)

(58) Field of Classification Search
CPC . F16K 31/06; F16K 31/0644; F16K 31/0648; F16K 31/0655; F16K 31/0658; F16K 31/0662; F16K 31/0665; F16K 31/0675; F16K 31/08; F16K 31/082
USPC .......... 251/129.07, 129.15; 335/262, 270, 281
See application file for complete search history.

(56) References Cited

U.S. PATENT DOCUMENTS

| | | | | |
|---|---|---|---|---|
| 3,921,111 | A | * | 11/1975 | Kowalski ...................... 335/255 |
| 4,425,767 | A | * | 1/1984 | Barbier ........................... 62/212 |
| 4,919,390 | A | * | 4/1990 | Ichiryu et al. ............ 251/129.15 |
| 4,936,543 | A | | 6/1990 | Kamibayasi |
| 5,513,832 | A | * | 5/1996 | Becker et al. ............ 251/129.18 |
| 6,877,717 | B2 | * | 4/2005 | Collins et al. ............ 251/129.15 |
| 2002/0113219 | A1 | * | 8/2002 | Rembold et al. ......... 251/129.14 |
| 2012/0001109 | A1 | | 1/2012 | Nanahara et al. |
| 2013/0153801 | A1 | * | 6/2013 | Sato et al. ................ 251/129.21 |

FOREIGN PATENT DOCUMENTS

| | | |
|---|---|---|
| JP | U-02-22479 | 2/1990 |
| JP | A-2002-122266 | 4/2002 |
| JP | A-2002-188744 | 7/2002 |
| JP | A-2008-039157 | 2/2008 |
| JP | A-2009-290154 | 12/2009 |

(Continued)

*Primary Examiner* — William McCalister
*Assistant Examiner* — Ian Paquette
(74) *Attorney, Agent, or Firm* — Oliff PLC

(57) ABSTRACT

An electromagnetic linear valve includes a housing including a core closing an opening at one end portion of the body portion, and a separation portion separating an interior into a first liquid chamber located in a core side and a second liquid chamber; a plunger disposed in the first liquid chamber so as to move along the axis in a state in which one end thereof faces to the core and the other end can sit on a hole; an elastic member applying a force to move the plunger away from the core; and a coil generating magnetic field to move the plunger toward the core. A recess is formed in a section of an inner circumferential portion of the body portion which intersects with an end face of the core in the first direction.

15 Claims, 7 Drawing Sheets

(56) References Cited

FOREIGN PATENT DOCUMENTS

| | | |
|---|---|---|
| JP | A-2010-060074 | 3/2010 |
| JP | A-2010-133490 | 6/2010 |
| JP | A-2011-012808 | 1/2011 |
| WO | 2011/077506 A1 | 6/2011 |

* cited by examiner

ELECTROMAGNETIC LINEAR VALVE

TECHNICAL FIELD

This invention relates to an electromagnetic linear valve which has a plunger and a housing in which the plunger is provided such that it can move along an axis thereof, and which opens/closes by moving the plunger.

BACKGROUND ART

Some electromagnetic linear valves each comprise (a) a housing which includes a hollow cylindrical body portion, a core portion which closes an opening of one end portion of the body portion, a separation portion which separates an interior defined by the core portion and the body portion into a first liquid chamber located at one side of the separation portion nearer to the core portion and a second liquid chamber located at the other side of the separation portion, and a through hole which passes through the separation portion so as to provide a communication between the first liquid chamber and the second liquid chamber, and (b) a plunger which is disposed in the first liquid chamber such that the plunger is movable along an axis in a state in which one end portion of the plunger faces to the core portion and the other end portion of the plunger faces to an opening of the thorough hole, the other end portion functioning as a valve body being allowed to sit on the opening functioning as a valve seat. The electromagnetic linear valve including such a plunger and a housing, prohibits a flow of an operating liquid from a high-pressure side operating liquid passage to a low-pressure side operating liquid passage in a state in which the valve body sits on the valve seat, and allows a flow of the operating liquid from the high-pressure side operating liquid passage to the low-pressure side operating liquid passage in a state in which the valve body is away from the valve seat. The electromagnetic linear valve further comprises an elastic member which applies a force to the plunger in a direction in which the valve body comes near to the valve seat, and a coil which generates magnetic field to move the plunger in an opposite direction to the direction in which the elastic member applies the force to the plunger. A pressure difference between a liquid pressure of the operating liquid in the high-pressure side operating liquid passage (hereinafter, this liquid pressure is referred to as a "high-pressure side operating liquid pressure", where appropriate) and a liquid pressure of the operating liquid in the high-pressure side operating liquid passage (hereinafter, this liquid pressure is referred to as a "low-pressure side operating liquid pressure", where appropriate) can be controllably varied by controlling an electric energy supplied to the coil. The following patent literature discloses one example of the electromagnetic linear valve having a construction in which the pressure difference between the high-pressure side operating liquid pressure and the low-pressure side operating liquid pressure can be controlled.

Patent Literature 1: JP-A-2008-39157

DISCLOSURE OF THE INVENTION

(A) Summary of the Invention

In the above electromagnetic linear valve, since the plunger is supported by the elastic member in the housing, self-excited vibration may occur in connection with an opening/closing of the valve. Various causes for occurrence of self-excited vibration are considered. For example, a decrease of a damping force against a movement of the plunger is considered as one of the causes. Although the movement of the plunger is damped by the operating liquid in the first liquid chamber, a damping effect by the operating liquid may be degraded when air bubbles are contained in the first liquid chamber. Thus, from such a point of view, restraining self-excited vibration of the plunger can improve efficiency of the electromagnetic linear valve. The present invention is carried out in the light of the current situation described above. It is therefore an object of the present invention to provide an electromagnetic linear valve with high efficiency.

To solve the described phenomenon, the electromagnetic linear valve according to the present invention has a recess which is formed in a section of an inner circumferential portion of a body portion of a housing, which inner circumferential portion intersects with an end face of the core portion facing to a plunger.

A liquid chamber defined by the core portion and an end portion of the plunger facing to the core portion is comparatively small. When air bubbles are contained in the small liquid chamber, influence on the degradation of the damping effect due to the air bubbles becomes comparatively large. The electromagnetic linear valve according to the present invention, can increase the volume of the liquid chamber by the above recess, thereby reducing the influence on the degradation of the damping effect due to the air bubbles. Furthermore, since the recess is formed in the inner circumferential portion of the body portion, the air bubbles contained in the recess is not compressed by the core portion and the plunger even when the plunger moves along the axis. Therefore, the influence on the degradation of the damping effect due to the air bubbles can be reduced. Thus, the electromagnetic linear valve according to the present invention can restrain self-excited vibration, whereby the electromagnetic linear valve with high efficiency is provided.

(B) Forms of Invention

There will be exemplified and described various forms according to an invention which is considered claimable (hereinafter referred to as "claimable invention" where appropriate). Each of the forms according to the invention is numbered like the appended claims and depends from the other form or forms, where appropriate. This is for easy understanding of the claimable invention, and it is to be understood that combinations of constituent elements that constitute the invention are not limited to those described in the following forms. That is, it is to be understood that the claimable invention shall be construed in the light of the following descriptions of various forms and embodiments. It is to be further understood that any form in which one or more elements is/are added to or deleted from any one of the following forms may be considered one form of the claimable invention.

Specifically, in the following forms, the form (1) corresponds to claim 1, a form in which the technical feature of the form (2) is added to claim 1 corresponds to claim 2, a form in which the technical feature of the form (3) is added to claim 1 or claim 2 corresponds to claim 3, a form in which the technical feature of the form (4) is added to claim 1 or claim 2 corresponds to claim 4, a form in which the technical feature of the form (5) is added to any one of claims 1-4 corresponds to claim 5, a form in which the technical feature of the form (6) is added to claim 5 corresponds to claim 6, a form in which the technical feature of the form (7) is added to any one of claims 1-6 corresponds to claim 7, a form in which the technical feature of the form (8) is added to claim 7 corresponds to claim 8, a form in which the technical feature of the form (9) is added to claim 8 corresponds to claim 9, a form in which the technical feature of the form (10) is added to claim 8 or claim 9 corresponds to claim 10, a form in which the technical feature of the form (11) is added to claim 10 corresponds to claim 11, a form in which the technical feature of the form (12) is added to claim 10 or claim 11 corresponds to claim 12, a form in which the technical feature of the form (13) is added to any one of claims 8-12 corresponds to claim 13, a form in which the technical feature of the form (14) is added to claim 13 corresponds to claim 14, a form in which the technical feature of the form (15) is added to claim 14 corresponds to claim 15, a form in which the technical feature of the form (16) is added to claim 15 corresponds to claim 16, a form in which the technical feature of the form (17) is added to claim 15 or claim 16 corresponds to claim 17, and a form in which the technical feature of the form (18) is added to any one of claims 14-17 corresponds to claim 18.

(1) An electromagnetic linear valve comprising:

a housing which includes a hollow cylindrical body portion, a core portion which closes an opening of one end portion of the body portion, a separation portion which separates an interior defined by the core portion and the body portion into a first liquid chamber located at one side of the separation portion nearer to the core portion and a second liquid chamber located at the other side of the separation portion, a through hole which passes through the separation portion so as to provide a communication between the first liquid chamber and the second liquid chamber, an outlet port which communicates with the first liquid chamber, and an inlet port which communicates with the second liquid chamber;

a plunger which is disposed in the first liquid chamber such that the plunger is movable along an axis in a state in which one end portion of the plunger faces to the core portion and the other end portion of the plunger faces to an opening of the thorough hole, the other end portion being allowed to sit on the opening as a valve body, an elastic member which applies a force to the plunger in a first direction in which the one end portion of the plunger pulls away from the core portion and in which the other end portion of the plunger comes near to the opening, and a coil which is disposed around the housing and generates magnetic field to move the plunger against the force of the elastic member in a second direction in which the one end portion of the plunger comes near to the core portion and in which the other end portion of the plunger pulls away from the opening, wherein a recess is formed in a section of an inner circumferential portion of the body portion, the inner circumferential portion intersecting with an end face of the core portion, the end face being a face, in the first direction, nearer to the opening.

In the electromagnetic linear valve, since the plunger is supported by the elastic member in the housing, self-excited vibration may occur in connection with an opening/closing of the valve. Various causes for occurrence of self-excited vibration are considered. For example, a decrease of a damping force against a movement of the plunger is considered as one of the causes. Although the movement of the plunger is damped by the operating liquid in the first liquid chamber, a damping effect by the operating liquid may be degraded when air bubbles are contained in the first liquid chamber. Therefore, the electromagnetic linear valve according to the present invention has the recess which is formed in the section of the inner circumferential portion of the body portion of the housing, which inner circumferential portion intersects with the end face of the core portion facing to the plunger.

The first liquid chamber in which the plunger is disposed includes a plunger-core-interposed liquid chamber which is a liquid chamber defined by the core portion and an end portion of the plunger facing to the core portion, and thus the plunger-core-interposed liquid chamber is comparatively small. Therefore, when air bubbles are contained in the small liquid chamber, the percentage of the volume of the air bubbles in the volume of the liquid chamber is comparatively large, the influence on the degradation of the damping effect due to the air bubbles is comparatively large. In the electromagnetic linear valve described in this form, since the recess is formed in the comparatively small liquid chamber, and the volume of the liquid chamber is enlarged by the recess, it becomes possible to decrease the percentage of the volume of the air bubbles in the volume of the liquid chamber. Additionally, in the conventional electromagnetic linear valves, the air bubbles contained in the plunger-core-interposed liquid chamber may be sandwiched and compressed between the plunger and the core portion in connection with a movement of the plunger. When the air bubbles are compressed by the plunger and the core portion in the movement of the plunger, the damping effect by the operating liquid may be degraded. In the electromagnetic linear valve of this form, since the recess is formed in the inner circumferential portion of the body portion intersecting with the end face of the core portion, the air bubbles in the plunger-core-interposed liquid chamber are easy to enter into the recess in association with a movement of the plunger. The air bubbles having entered into the recess are not compressed by the core portion and the plunger even when the plunger moves. Accordingly, the electromagnetic linear valve of this form can reduce the influence on the degradation of the damping effect due to the air bubbles, thereby restraining self-excited vibration of the plunger.

The "recess" described in this form is formed in the inner circumferential portion of the body portion, and may be formed in a circular shape along the inner circumferential portion or in a part of a circular section along the inner circumferential portion. The "recess" may be formed in the section of the inner circumferential portion of the body portion intersecting with the end face of the core portion, in other words, may be formed in a section of the body portion continuing to an end face of the core portion. Furthermore, in other words, the "recess" may be formed in the section of the inner circumferential portion of the body portion such that an end of the section nearer to the core portion in the second direction corresponds to the end face of the core portion nearer to the opening in the first direction.

(2) The electromagnetic linear valve according to the form (1), wherein the recess is formed in a circular shape along the inner circumferential portion of the body portion.

In the electromagnetic linear valve of this form, the recess has a shape like a circular ring. Therefore, according to the electromagnetic linear valve of this form, the air bubbles in the plunger-core-interposed liquid chamber are easy to enter into the recess, whereby it becomes possible to further reduce the influence on the degradation of the damping effect due to the air bubbles.

(3) The electromagnetic linear valve according to the form (1) or (2), wherein the core portion and at least a portion of the body portion are integrally formed of a single material composed of ferromagnetic material, the at least a portion of the body portion continuing to the core portion, wherein an end portion of the at least a portion of the body portion is non-magnetized, the at least a portion continuing to the core portion, and the end portion being nearer to the core portion, and wherein the recess is formed in an inner circumferential portion of the end portion.

In the electromagnetic linear valve of this form, the core portion and the at least a portion of the body portion which constitute the housing are integrally formed of a single material. Thus, according to the electromagnetic linear valve of this form, the number of parts of the electromagnetic linear valve can be reduced, its cost can be reduced, its manufacturing process can be simplified, or the like. The "recess" described in this form is a recess formed in the non-magnetized portion of the body portion, and may be formed in all or a part of the non-magnetized portion. Moreover, the "recess" may be formed not only in the non-magnetized portion of the body portion but also in across the non-magnetized portion and the ferromagnetic portion of the body portion. In short, it is acceptable as long as the "recess" of this form is formed in at least the non-magnetized portion of the body portion.

(4) The electromagnetic linear valve according to the form (1) or (2), wherein the core portion is constituted by a member composed of ferromagnetic material and having a solid cylindrical shape, wherein the body portion comprises (a) a hollow cylindrical member which is composed of ferromagnetic material and has a hollow cylindrical shape, and (b) a connecting member which is fitted around the core portion and the hollow cylindrical member so as to connect the core portion and the hollow cylindrical member in a state in which an end face of the core portion and an end face of the hollow cylindrical member are spaced apart from each other, the connecting member being composed of non-magnetic material, and wherein the recess is defined and formed by: the end face of the hollow cylindrical member; a portion of the end face, which faces to the end face of the hollow cylindrical member, of the core portion; and an inner circumferential face of the connecting member.

In the electromagnetic linear valve of this form, the recess having the shape like a circular ring is inevitably formed in the inner circumferential portion of the body portion. Therefore, according to the electromagnetic linear valve of this form, even when a certain measure for forming the recess in the inner circumferential portion of the body portion is not implemented, it becomes possible to reduce the influence on the degradation of the damping effect due to the air bubbles.

(5) The electromagnetic linear valve according to any one of the forms (1)-(4), wherein the first liquid chamber includes a plunger-core-interposed liquid chamber which is defined by the one end portion of the plunger and the core portion, and whose volume is reduced as the plunger moves in the second direction, and wherein the volume of the recess is not less than a difference between the volume of the plunger-core-interposed liquid chamber in a state in which the other end portion of the plunger sits on the opening and the volume of the plunger-core-interposed liquid chamber in a state in which the plunger is placed in the farthest position thereof in the second direction.

(6) The electromagnetic linear valve according to the form (5), wherein the volume of the recess is not less than the double of a difference between the volume of the plunger-core-interposed liquid chamber in the state in which the other end portion of the plunger sits on the opening and the volume of the plunger-core-interposed liquid chamber in the state in which the plunger is placed in the farthest position thereof in the second direction.

To each of the electromagnetic linear valves of the above two forms, a limitation is added regarding the volume of the plunger-core-interposed liquid chamber increased by the recess. The volume of the plunger-core-interposed liquid chamber comes into being the largest when the valve is closed, and comes into being smaller as the plunger moves in the second direction. That is, as the plunger moves in the second direction, the percentage of the volume of the air bubbles in the volume of the plunger-core-interposed liquid chamber increases, therefore the possibility of occurrence of the degradation of the damping effect to the plunger due to the air bubbles becomes higher. The maximum decrease amount of the volume of the plunger-core-interposed liquid chamber whose volume is decreased in connection with a movement of the plunger is a remainder calculated by that the volume of the plunger-core-interposed liquid chamber in a state in which the plunger is placed in the farthest position thereof in the second direction is subtracted from the volume of the plunger-core-interposed liquid chamber in a state in which the valve is closed. In the above two electromagnetic linear valves, the maximum decrease amount of the volume of the plunger-core-interposed liquid chamber is not more than the volume increased by the recess of the plunger-core-interposed liquid chamber. Therefore, according to the electromagnetic linear valve of the above two forms, it becomes possible to reduce the influence on the degradation of the damping effect due to the air bubbles in connection with a movement of the plunger in the second direction.

(7) The electromagnetic linear valve according to any one of the forms (1)-(6), wherein a stepped face is formed on an outer circumferential portion of the one end portion of the plunger, whereby the plunger has a stepped shape in which an outer diameter of the one end portion is smaller in an end of the one end portion than in others of the one end portion, wherein the core portion has a concave portion which is formed in an end thereof that is nearer to the opening in the first direction, and into which a portion of the plunger is inserted, the portion of the plunger being a portion, in the second direction, nearer to the core portion than the stepped face of the plunger, and wherein the stepped face is placed, in the second direction along the axis, nearer to the core portion than an end of the recess which is an end nearer to the opening in the first direction in a state in which the other end portion of the plunger sits on the opening.

In the electromagnetic linear valve of this form, a clearance between an outer circumferential face of the plunger and an inner circumferential face of the body portion is open to the recess. Therefore, the air bubbles contained in the recess are easy to be ejected through the clearance from the plunger-core-interposed liquid chamber.

(8) The electromagnetic linear valve according to the form (7), wherein a first-direction stepped face is a stepping face facing in the first direction is formed on one of an outer circumferential portion of the plunger and the inner circumferential portion of the body portion in order that one of (a) an intermediate portion which is a portion between the one end portion and the other end portion of the plunger and (b) an internal portion of the body portion of the housing has a stepped shape, whereby a clearance between an outer circumferential face of the plunger and an inner circumferential face of the body portion is larger in a first section than in a second section, the first section being a section, in the first direction, nearer to the opening than the first-direction stepped face, the second section being a section, in the second direction, nearer to the core portion than the first-direction stepped face.

As described above, the volume of the plunger-core-interposed liquid chamber is decreased in connection with a movement of the plunger in the second direction. Therefore, as the plunger moves in the second direction, the operating liquid in the plunger-core-interposed liquid chamber flows into the clearance between the outer circumferential face of the plunger and the inner circumferential face of the body portion, and, at the same time, the air bubbles in the plunger-core-interposed liquid chamber may flow into the clearance. However, the volume of the plunger-core-interposed liquid chamber increases in connection with a movement of the plunger in the first direction, whereby the operating liquid flows from the clearance into the plunger-core-interposed liquid chamber. Therefore, where the clearance has a uniform shape, the air bubbles having been ejected from the plunger-core-interposed liquid chamber into the clearance may be drawn back into the plunger-core-interposed liquid chamber.

In the electromagnetic linear valve of this form, the clearance is small in a portion being between the end of the recess nearer to the opening in the first direction and the first-direction stepped face, and is large in a portion being, in the first direction, nearer to the opening than the first-direction stepped face. That is, the clearance between the outer circumferential face of the plunger and the inner circumferential face of the body portion is constituted by a first clearance portion which is a portion between the end of the recess nearer to the opening in the first direction and the first-direction stepped face, and a second clearance portion which is, in the first direction, nearer to the opening than the first-direction stepped face and which is larger than the first clearance portion. Therefore, once the air bubbles are ejected from the plunger-core-interposed liquid chamber into the second clearance portion in a movement of the plunger in the second direction, the air bubbles having been ejected into the second clearance portion are hard to enter into the first clearance portion even in a movement of the plunger in the first direction, whereby the air bubbles are hard to be drawn back into the plunger-core-interposed liquid chamber. Thus, according to the electromagnetic linear valve of this form, the air bubbles are easy to be ejected from the plunger-core-interposed liquid chamber, whereby it becomes possible to reduce the influence on the degradation of the damping effect due to the air bubbles.

(9) The electromagnetic linear valve according to the form (8), wherein the first liquid chamber includes a plunger-core-interposed liquid chamber which is defined by the one end portion of the plunger and the core portion, and whose volume is reduced as the plunger moves in the second direction, and wherein the volume of the clearance which is present between the first-direction stepped face and the end of the recess nearer to the opening in the first direction in a state in which the other end portion of the plunger sits on the opening, is less than a difference between the volume of the plunger-core-interposed liquid chamber in a state in which the other end portion of the plunger sits on the opening and the volume of the plunger-core-interposed liquid chamber in a state in which the plunger is placed in the farthest position thereof in the second direction.

By forming the first-direction stepped face on one of the outer circumferential portion of the plunger and the inner circumferential portion of the body portion, as described above, the air bubbles having been ejected from the plunger-core-interposed liquid chamber are hard to be drawn back again to the liquid chamber. However, in order not to draw back the air bubbles as such, the air bubbles are needed to be ejected through the first clearance portion into the second clearance portion in a movement of the plunger in the second direction. In the electromagnetic linear valve of this form, the volume of the first clearance portion is less than the maximum decrease amount of the volume of the plunger-core-interposed liquid chamber whose volume is decreased in connection with a movement of the plunger, that is, the maximum amount of the operating liquid flowing out from the plunger-core-interposed liquid chamber in connection with the plunger. Therefore, according to the electromagnetic linear valve of this form, the air bubbles in the plunger-core-interposed liquid chamber are easy to be ejected through the first clearance portion into the second clearance portion in a movement of the plunger, whereby the air bubbles in the plunger-core-interposed liquid chamber can be effectively ejected.

(10) The electromagnetic linear valve according to the form (8) or (9), wherein the first-direction stepped face is formed on the outer circumferential portion of the plunger, and the intermediate portion of the plunger has a stepped shape.

Where the first-direction stepped face is formed on the outer circumferential portion of the plunger, a portion which has a small outer diameter is formed in the plunger due to the first-direction stepped face. On the other hand, where the first-direction stepped face is formed on the inner circumferential portion of the body portion, a portion which has a large inner diameter is formed in the body portion of the housing due to the first-direction stepped face, whereby the body portion may become thick. Thus, according to the electromagnetic linear valve of this form, the electromagnetic linear valve having a compact construction can restrain self-excited vibration.

(11) The electromagnetic linear valve according to the form (10), wherein the first-direction stepped face is placed, in the first direction along the axis, nearer to the opening than the end of the recess nearer to the opening in the first direction in a state in which the plunger is placed in the farthest position thereof in the second direction.

In a case in which the first-direction stepped face is formed on the outer circumferential portion of the plunger, as the plunger moves in the second direction, the first-direction stepped face also moves in the second direction, thereby decreasing the volume of the first clearance portion. That is, the length of the first clearance portion along the axis becomes short in connection with a movement of the plunger in the second direction. In an extreme case, the length of the first clearance portion along the axis becomes zero, resulting in no first clearance portion. Since the first clearance portion acts for preventing the air bubbles from entering into the plunger-core-interposed liquid chamber, it is desirable that the first clearance portion is present even in a state in which the plunger is placed in the farthest position thereof in the second direction. According to the electromagnetic linear valve of this form, the first clearance portion is present even in a state in which the plunger is placed in the farthest position thereof in the second direction, whereby the entry of the air bubbles into the plunger-core-interposed liquid chamber can be restrained.

(12) The electromagnetic linear valve according to the form (10) or (11), wherein the first liquid chamber includes a plunger-core-interposed liquid chamber which is defined by the one end portion of the plunger and the core portion, and whose volume is reduced as the plunger moves in the second direction, and wherein the volume of the clearance which is present between the first-direction stepped face and the end of the recess nearer to the opening in the first direction in a state in which the plunger is placed in the farthest position thereof in the second direction, is not less than one third of a difference between the volume of the plunger-core-interposed liquid chamber in a state in which the other end portion of the plunger sits on the opening and the volume of the plunger-core-interposed liquid chamber in a state in which the plunger is placed in the farthest position thereof in the second direction.

In the electromagnetic linear valve of this form, the volume of the first clearance portion is secured at a certain degree in a state in which the plunger is placed in the farthest position thereof in the second direction. Thus, according to the electromagnetic linear valve of this form, the entry of the air bubbles into the plunger-core-interposed liquid chamber can be effectively restrained.

(13) The electromagnetic linear valve according to any one of the forms (8)-(12), wherein a second-direction stepped face is formed on the other of the outer circumferential portion of the plunger and the inner circumferential portion of the body portion, the second-direction stepped face facing in the second direction so as to face to the first-direction stepped face, and wherein the other of the intermediate portion of the plunger and the internal portion of the body portion of the housing also has a stepped shape.

In the electromagnetic linear valve of this form, the clearance between the outer circumferential face of the plunger and the inner circumferential face of the body portion is sectioned into the first clearance portion, the second clearance portion, and a third clearance portion which is smaller than the second clearance portion and is, in the first direction, nearer to the opening than the second-direction stepped face. That is, it is considered that, in the clearance between the outer circumferential face of the plunger and the inner circumferential face of the body portion, there are formed two chokes which are constituted by the first clearance portion and the third clearance portion. Therefore, according to the electromagnetic linear valve of this form, the entry of the air bubbles into the plunger-core-interposed liquid chamber can be restrained.

(14) The electromagnetic linear valve according to the form (13), wherein a plunger stepped face facing in the first direction is formed on the outer circumferential portion of the plunger in order that the plunger has a stepped shape between the intermediate portion and the other end portion, wherein the first liquid chamber includes a plunger-core-interposed liquid chamber which is defined by the one end portion of the plunger and the core portion and whose volume is reduced as the plunger moves in the second direction, and wherein the volume of the clearance which is present between the plunger stepped face and the second-direction stepped face in a state in which the other end portion of the plunger sits on the opening, is less than a difference between the volume of the plunger-core-interposed liquid chamber in a state in which the other end portion of the plunger sits on the opening and the volume of the plunger-core-interposed liquid chamber in a state in which the plunger is placed in the farthest position thereof in the second direction.

In the electromagnetic linear valve of this form, the volume of the third clearance portion is, like the volume of the first clearance portion, less than the maximum decrease amount of the volume of the plunger-core-interposed liquid chamber whose volume is decreased in connection with a movement of the plunger. Therefore, in connection with a movement of the plunger in the second direction, the air bubbles in the second clearance portion can be ejected through the third clearance portion into a liquid chamber, in the first direction, nearer to the opening than the plunger stepped face. Thus, according to the electromagnetic linear valve of this form, the entry of the air bubbles in the second clearance portion into the plunger-core-interposed liquid chamber can be restrained.

(15) The electromagnetic linear valve according to the form (14), wherein the first-direction stepped face is formed on the outer circumferential portion of the plunger, and the second-direction stepped face is formed on the inner circumferential portion of the body portion.

(16) The electromagnetic linear valve according to the form (15), wherein the plunger stepped face is placed, in the first direction along the axis, nearer to the opening than the second-direction stepping face in a state in which the plunger is placed in the farthest position thereof in the second direction.

(17) The electromagnetic linear valve according to the form (15) or (16), wherein the first liquid chamber includes a plunger-core-interposed liquid chamber which is defined by the one end portion of the plunger and the core portion, and whose volume is reduced as the plunger moves in the second direction, and wherein the volume of the clearance which is present between the plunger stepped face and the second-direction stepped face in a state in which the plunger is placed in the farthest position thereof in the second direction, is not less than one third of a difference between the volume of the plunger-core-interposed liquid chamber in a state in which the other end portion of the plunger sits on the opening and the volume of the plunger-core-interposed liquid chamber in a state in which the plunger is placed in the farthest position thereof in the second direction.

In a case in which the second-direction stepped face is formed on the inner circumferential portion of the housing, as the plunger moves in the second direction, the volume of the third clearance portion decreases like the first clearance portion. Since the third clearance portion acts for preventing the air bubbles from entering from the liquid chamber, in the first direction, nearer to the opening than the plunger stepped face into the second clearance portion, it is desirable that the third clearance portion, like the first clearance portion, is present even in a state in which the plunger is placed in the farthest position thereof in the second direction. In the electromagnetic linear valve of the second form of the above forms, the third clearance portion is present even in a state in which the plunger is placed in the farthest position thereof in the second direction. In the electromagnetic linear valve of the third form of the above forms, the volume of the third clearance portion is secured at a certain degree in a state in which the plunger is placed in the farthest position thereof in the second direction. Therefore, according to the electromagnetic linear valves of these two forms, the entry of the air bubbles from the liquid chamber in the first direction of the plunger stepped face into the second clearance portion can be restrained.

(18) The electromagnetic linear valve according to any one of the forms (14)-(17), wherein the plunger comprises (a) a large diameter portion and (b) a small diameter portion, and a stepped face between the large diameter portion and the small diameter portion functions as the plunger stepped face, wherein the large diameter portion which is a portion, in the second direction, nearer to the core portion than the stepped face and which is composed of ferromagnetic material, and the small diameter portion which is a portion continuing to the large diameter portion, which is a portion, in the first direction, nearer to the opening than the stepped face, and which is composed of ferromagnetic material, wherein the body portion of the housing includes (a) a first inner diameter portion in which the large diameter portion is inserted and which is composed of ferromagnetic material, and (b) a second inner diameter portion which continues to the first inner diameter portion, whose inner diameter is shorter than that of the first inner diameter portion, in which the large diameter portion is inserted, and which is composed of ferromagnetic material, wherein, on one of an outer circumferential portion of the large diameter portion and the first inner diameter portion, the first-direction stepped face is formed, and, on the other of the outer circumferential portion of the large diameter portion and the first inner diameter portion, the second-direction stepped face is formed, and wherein the electromagnetic linear valve has a construction in which, when the plunger moves in the first liquid chamber, the small diameter portion and the second inner diameter portion slidably contact with each other while the plunger and the first inner diameter portion does not slidably contact with each other.

As an approach for restraining self-excited vibration of the plunger, not only the approach for coping with the degradation of the damping effect due to the air bubbles but also, for example, an approach for increasing a friction force which is generated between the plunger and the inner circumferential face of the housing can be conceived. Though an increase of the friction force between the plunger and the inner circumferential face of the housing can restrain self-excited vibration, such an increase of the friction force may result in not appropriately controlling a pressure difference between a high-pressure side operating liquid pressure and a low-pressure side operating liquid pressure.

The electromagnetic linear valve of the form is configured such that, in a movement of the plunger, the small diameter portion and the second inner diameter portion slidably contact with each other but the large diameter portion and the first inner diameter portion do not slidably contact with each other. In addition, the small diameter portion of the plunger has a diameter smaller than the large diameter portion, and the cross section area of the plunger is sharply changed between the large diameter portion and the small diameter portion. Therefore, due to a magnetic saturation in the small diameter portion of the plunger, the amount of a magnetic flux flowing through a contact area between the plunger and the inner circumferential face of the housing is less than the whole amount of a magnetic flux flowing through the plunger. That is, though a certain amount of the magnetic flux passes through the plunger, it is possible to decrease the amount of the magnetic flux passing through the contact area between the plunger and the inner circumferential face of the housing.

The amount of the magnetic flux flowing through the contact area between the plunger and the inner circumferential face of the housing, as described later in detail, greatly associates with the friction force which is generated between the plunger and the inner circumferential face of the housing, and as the amount of the magnetic flux flowing through the contact area increases, the friction force increases too. On the other hand, the amount of the magnetic flux flowing through the plunger, as described later in detail too, greatly associates with an electromotive force depending on electromagnetic induction resulting from a movement of the plunger, and the electromotive force increases as the amount of the magnetic flux flowing through the plunger increases. The electromotive force acts in a direction in which the movement of the plunger is prevented. Thus, according to the electromagnetic linear valve of this form, it becomes possible to decrease the friction force between the plunger and the inner circumferential face of the housing as well as to generate an electromotive force with a certain magnitude. That is, it becomes possible to restrain self-excited vibration of the plunger without generating a large friction force between the plunger and the inner circumferential face of the housing.

BEST MODE FOR CARRYING OUT THE INVENTION

There will be described in detail, with reference to the drawings, an embodiment according to the claimable invention and an embodiment in which the embodiment is modified. It is to be understood, however, that the claimable invention may be carried out in the following embodiment, the following modified embodiment, and various other embodiments including embodiments described in the forms of the above "FORMS OF INVENTION" and embodiments provided with various changes and modifications on the basis of knowledge of those skilled in the art.

Embodiment

1. Construction of Electromagnetic Linear Valve

Figure 1:
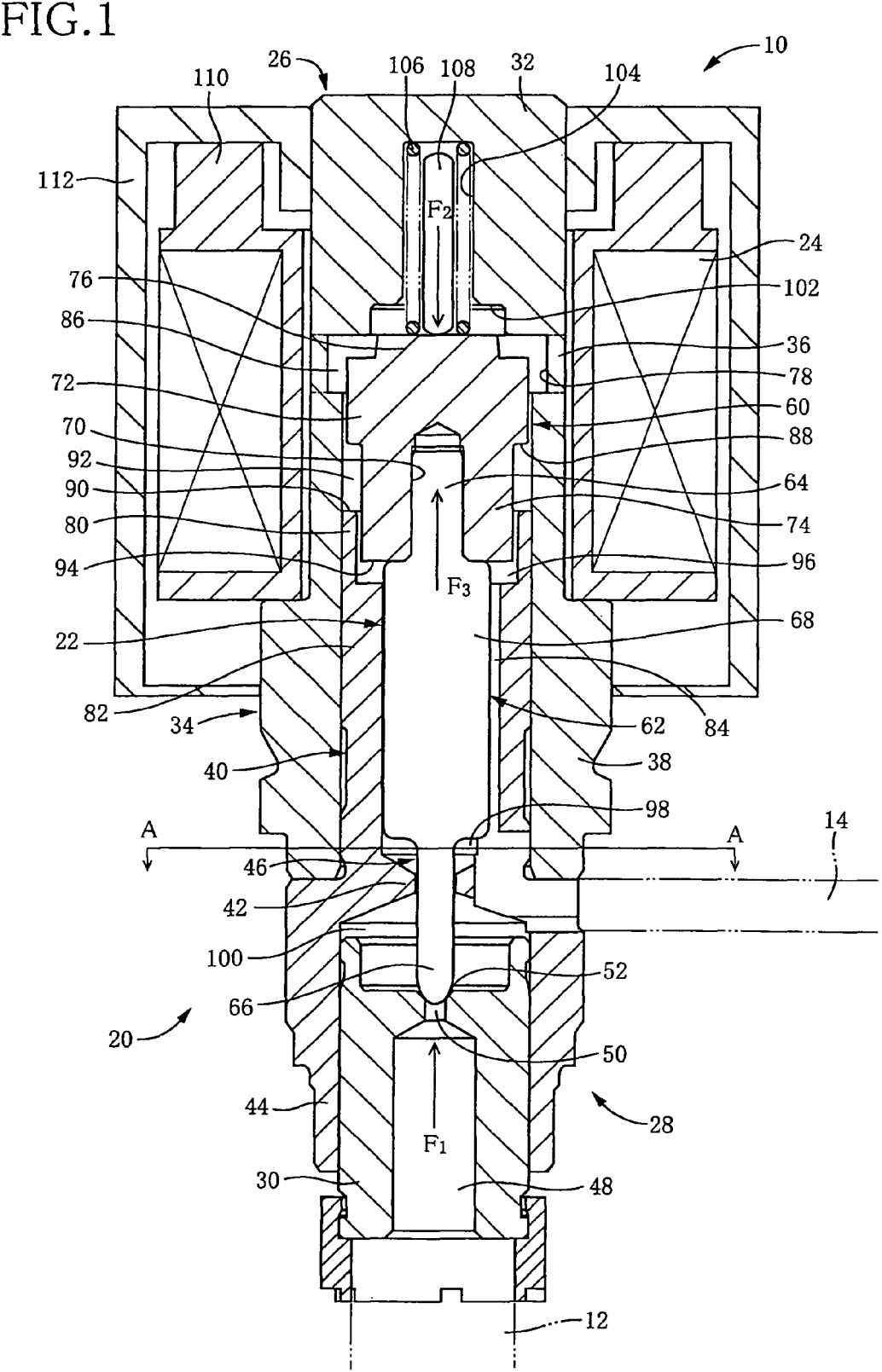
FIG. 1 is a schematic cross sectional view of an electromagnetic linear valve of an embodiment according to the claimable invention.

FIG. 1 shows an electromagnetic linear valve 10 of the embodiment. The electromagnetic linear valve 10 is connected with a high-pressure side operating liquid passage 12 and a low-pressure side operating liquid passage 14. The electromagnetic linear valve 10 normally prohibits a flow of an operating liquid from the high-pressure side operating liquid passage 12 to the low-pressure side operating liquid passage 14 by that a valve body sits on a valve seat. On the other hand, the electromagnetic linear valve 10 allows the flow of the operating liquid from the high-pressure side operating liquid passage 12 to the low-pressure side operating liquid passage 14 by that the valve body separates from the valve seat. The electromagnetic linear valve 10 can controllably vary a pressure difference, at the moment of allowing the flow of the operating liquid, between a liquid pressure of the operating liquid in the high-pressure side operating liquid passage 12 and a liquid pressure of the operating liquid in the low-pressure side operating liquid passage 14.

The electromagnetic linear valve 10, as shown in FIG. 1, includes a housing 20 having a hollow cylindrical shape, a plunger 22 provided in the housing 20 while being movable along an axis of the plunger 22, and a coil 24 provided on an outer circumference of the housing 20 and having a hollow cylindrical shape. The housing 20 includes: a closed-end cylindrical member 26 having a hollow cylindrical shape whose end is closed; a guide member 28 which is fitted in the closed-end cylindrical member 26 from a lower end portion thereof, which guides the plunger 22 in a movement thereof along the axis, and which has a generally hollow cylindrical shape; and a valve member 30 fitted in a lower end portion of the guide member 28.

The closed-end cylindrical member 26 of the housing 20 includes a core portion 32 having a solid cylindrical shape, and a hollow cylindrical portion 34. The closed-end cylindrical member 26 is integrally formed of a single material composed of ferromagnetic material. However, an upper end portion of the hollow cylindrical portion 34, that is, a portion of the hollow cylindrical portion 34 continuing to the core portion 32 is non-magnetized by a laser processing. Accordingly, the closed-end cylindrical member 26 can be sectioned into: the core portion 32 having ferromagnetic property; a non-magnetized upper end portion 36 of the hollow cylindrical portion 34 (hereinafter, the non-magnetized upper end portion is referred to as the "non-magnetized hollow cylindrical portion", where appropriate); and a portion 38 of the hollow cylindrical portion 34 other than the non-magnetized hollow cylindrical portion 36 having ferromagnetic property (hereinafter, the portion is referred to as the "ferromagnetic hollow cylindrical portion", where appropriate). It is noted that, in FIG. 1, an interface between the core portion 32 and the non-magnetized hollow cylindrical portion 36, and an interface between the non-magnetized hollow cylindrical portion 36 and the ferromagnetic hollow cylindrical portion 38 are each indicated by a dotted line. Additionally, the guide member 28 constituting the housing 20 is also formed of ferromagnetic material and is fixedly fitted in the ferromagnetic hollow cylindrical portion 38 of the closed-end cylindrical member 26.

The guide member 28 can be sectioned into: a fit-in portion 40 fitted in the ferromagnetic hollow cylindrical portion 38; a projecting portion 42 which continues to the fit-in portion 40 and is below the fit-in portion 40, and whose inner wall face projects to the center; and a lower end portion 44 continuing to the projecting portion 42 and being in a lower side. In the lower end portion 44, the valve member 30 as the separation portion is fixedly fitted, and separates the inside of the housing 20 into a first liquid chamber 46 and a second liquid chamber 48. In the first liquid chamber 46, the plunger 22 is provided. There is provided an opening for the second liquid chamber 48 at a lower end face of the housing 20, and the opening serves as the inlet port, whereby the high-pressure side operating liquid passage 12 is connected to the second liquid chamber 48. Additionally, in the valve member 30, there is formed a through hole 50 passing through the valve member 30 along the axis. An opening 52 in an upper side of the through hole 50 is shaped into a tapered shape, and the opening 52 functions as the valve seat.

The plunger 22 is provided inside the first liquid chamber 46 such that it is movable along the axis of the plunger 22. The first liquid chamber 46 is defined by a body portion constituted by the hollow cylindrical portion 34 and the guide member 28, the core portion 32, and the valve member 30.

The plunger 22 includes: a solid cylindrical member 60 formed of ferromagnetic material and having a generally solid cylindrical shape; and a stepped member 62 fixed to a lower end of the solid cylindrical member 60, formed of ferromagnetic material, and having a stepped shape. The stepped member 62 can be separated into a press fit portion 64 being in an upper end portion thereof, a rod portion 66 being in a lower end portion thereof, and a slide contact portion 68 being between the press fit portion 64 and the rod portion 66. On a lower end face of the solid cylindrical member 60, a blind hole 70 is formed, and the press fit portion 64 of the stepped member 62 is pressed to be fitted in the blind hole 70. Additionally, the solid cylindrical member 60 as the large diameter portion also has a stepped shape, and thus includes: a first solid cylindrical portion 72 having the largest outer diameter; a second solid cylindrical portion 74 continuing to and being below the first solid cylindrical portion 72, and having the outer diameter smaller than that of the first solid cylindrical portion 72; and a protruding portion 76 formed in an upper end of the first solid cylindrical portion 72.

On the other hand, the inside of the housing 20 also has a stepped shape. Specifically, the hollow cylindrical portion 34 of the closed-end cylindrical member 26 constituting the housing 20 is, as described above, sectioned into the non-magnetized hollow cylindrical portion 36 and the ferromagnetic hollow cylindrical portion 38, while the inner diameter of the non-magnetized hollow cylindrical portion 36 is larger than that of the ferromagnetic hollow cylindrical portion 38. That is, along an inner circumferential portion of the upper end portion of the hollow cylindrical portion 34, a recess 78 is formed in a circular shape, and a place in which the recess 78 is formed is the non-magnetized hollow cylindrical portion 36. Additionally, the fit-in portion 40 of the guide member 28 fitted in the ferromagnetic hollow cylindrical portion 38 can be sectioned into a first fit-in portion 80 being in an upper end portion thereof and having the largest inner diameter, and a second fit-in portion 82 continuing to and being below the first fit-in portion 80 and having the inner diameter smaller than that of the first fit-in portion 80. It is noted that the inner diameter of the projecting portion 42 continuing to and being below the projecting portion 40 is smaller than that of the second fit-in portion 82. That is, the portions of the housing 20 can be arranged as follows in such a way that their inner diameters reduces: the non-magnetized hollow cylindrical portion 36, the ferromagnetic hollow cylindrical portion 38, the first fit-in portion 80, the second fit-in portion 82, and the projecting portion 42.

In the housing 20 having a stepped shape inside thereof, the plunger 22 having a stepped shape is inserted with a clearance being provided therebetween. In detail, the first solid cylindrical portion 72 is inserted in across the non-magnetized hollow cylindrical portion 36 and the ferromagnetic hollow cylindrical portion 38, and the second solid cylindrical portion 74 is inserted in across the ferromagnetic hollow cylindrical portion 38 and the first fit-in portion 80. Moreover, the slide contact portion 68 is mainly inserted in the second fit-in portion 82, and the rod portion 66 passes through the projecting portion 42 and extends into the inside of the lower end portion 44. Additionally, a relation between the outer diameter of the plunger 22 and the inner diameter of the housing 20 is described as follows. The outer diameter of the first solid cylindrical portion 72 is slightly smaller than the inner diameter of the ferromagnetic hollow cylindrical portion 38, and the outer diameter of the second solid cylindrical portion 74 is slightly smaller than the inner diameter of the first fit-in portion 80. Moreover, the outer diameter of the slide contact portion 68 is slightly smaller than the inner diameter of the second fit-in portion 82, and the outer diameter of the rod portion 66 is slightly smaller than the inner diameter of the projecting portion 42. That is, respective clearances are provided between the first solid cylindrical portion 72 and the ferromagnetic hollow cylindrical portion 38, between the second solid cylindrical portion 74 and the first fit-in portion 80, between the slide contact portion 68 and the second fit-in portion 82, and between the rod portion 66 and the projecting portion 42, and thus the plunger 22 is allowed to smoothly move inside the housing 20. In addition, the clearance between the slide contact portion 68 and the second fit-in portion 82 is smaller than any of the clearance between the first solid cylindrical portion 72 and the ferromagnetic hollow cylindrical portion 38, the clearance between the second solid cylindrical portion 74 and the first fit-in portion 80, and the clearance between the rod portion 66 and the projecting portion 42. Therefore, where the axis of the plunger 22 and an axis of the housing 20 are misaligned, the plunger 22 and the housing 20 contact to each other only at the slide contact portion 68 as the small diameter portion and the second fit-in portion 82 as the second inner diameter portion. That is, where the axis of the plunger 22 and the axis of the housing 20 are misaligned, the large diameter portion constituted by the first solid cylindrical portion 72 and the second solid cylindrical portion 74, and a first inner diameter portion constituted by the ferromagnetic hollow cylindrical portion 38 and the first fit-in portion 80 do not contact to each other.

Figure 2:
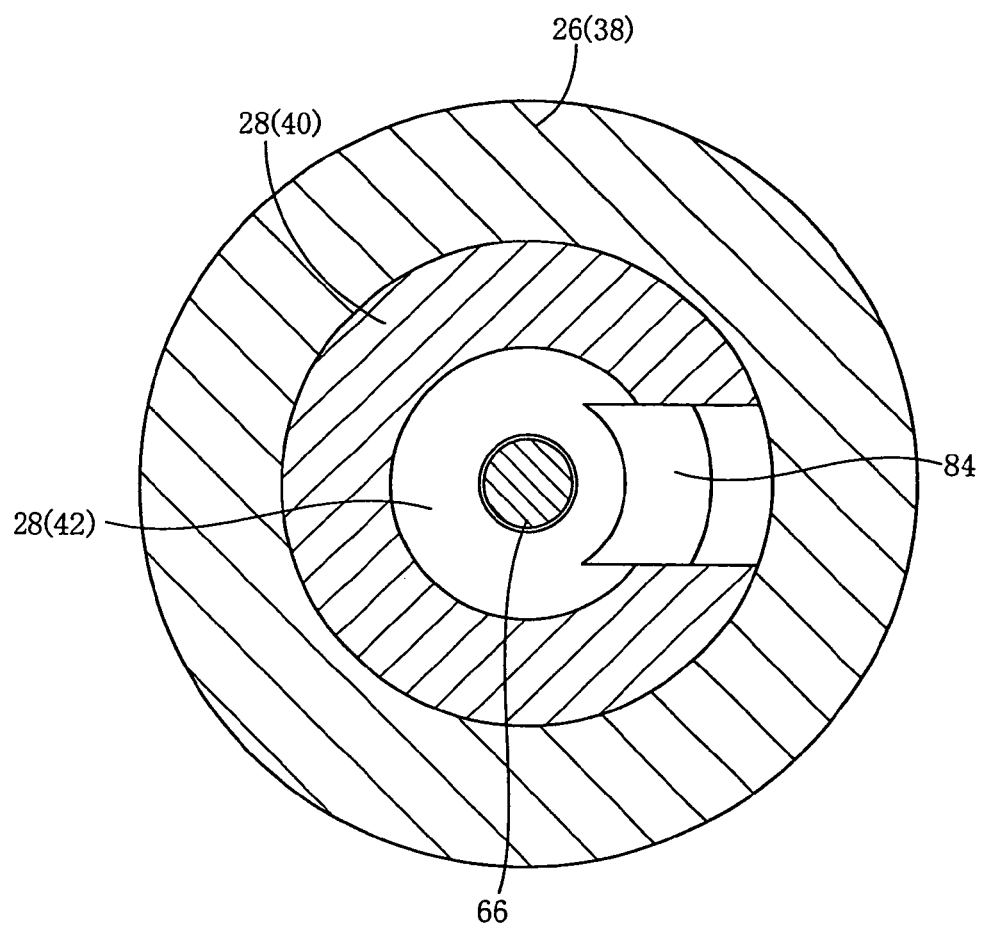
FIG. 2 is a schematic cross sectional view along the line A-A shown in FIG. 1.

Additionally, in the guide member 28 for guiding the plunger 22 in a movement thereof along the axis, there is formed a notch portion 84 extending along the axis. The notch portion 84, as shown in FIG. 1 and FIG. 2 which is a cross sectional view along the line A-A shown in FIG. 1, has a structure in which a notch is provided at a portion of an inner wall of the second fit-in portion 82 of the guide member 28 and a portion of an outer wall face of the projecting portion 42, and no notch is provided on an inner wall face of the projecting portion 42. The notch portion 84 allows a plurality of liquid chambers in the housing 20 to communicate with each other, and allows the inside of the housing 20 and the low-pressure side operating liquid passage 14 to communicate with each other.

In detail, the first liquid chamber 46 in the housing 20 is constituted by five liquid chambers, that is: a first plunger liquid chamber 86, as the plunger-core-interposed liquid chamber, defined by the core portion 32 and an upper end portion of the plunger 22; a second plunger liquid chamber 92 defined by a stepped face 88 between the first solid cylindrical portion 72 and the second solid cylindrical portion 74 and an upper end face 90 of the guide member 28; a third plunger liquid chamber 96 defined by a stepped face 94 between the second solid cylindrical portion 74 and the slide contact portion 68 and a stepped face between the first fit-in portion 80 and the second fit-in portion 82; a fourth plunger liquid chamber 98 defined by a stepped face between the slide contact portion 68 and the rod portion 66 and a stepped face between the second fit-in portion 82 and the projecting portion 42; and a fifth plunger liquid chamber 100 defined by the projecting portion 42 and the valve member 30. Three liquid chambers 96, 98, 100 of these five liquid chambers except for the first plunger liquid chamber 86 and the second plunger liquid chamber 92 communicate with one another through the notch portion 84. Additionally, a lower end portion of the notch portion 84 has an opening on an outer circumferential face of the guide member 28, and the opening serves as the outlet port.

By the way, a lower end of the rod portion 66 of the plunger 22 has a spherical shape and is constituted so as to face to the opening 52 of the through hole 50 formed in the valve member 30. The lower end of the rod portion 66 is constituted so as to sit on the opening 52 and serves as the valve body. The through hole 50 is closed by that the lower end of the rod portion 66 serving as the valve body sits on the opening 52 serving as the valve seat. Incidentally, the stepped member 62 including the rod portion 66 is formed of ferromagnetic material, and has a surface on all of which a surface heat treatment, more specifically, a carburizing and quenching treatment for increasing the hardness of a surface of the stepped member 62 is applied. Therefore, the hardness of the lower end of the rod portion 66 serving as the valve body is relatively high.

In the core portion 32 of the closed-end cylindrical member 26 of the housing 20, a concave portion 102 is formed so as to face to the protruding portion 76 being in the upper end portion of the plunger 22, and a blind hole 104 is formed on a bottom face of the concave portion 102. In the blind hole 104, a coil spring 106 is inserted. A lower end portion of the coil spring 106 projects from the blind hole 104, and the coil spring 106 is disposed in a state in which it is compressed between the bottom face of the blind hole 104 and an upper end face of the plunger 22. Therefore, the plunger 22 is pressed in a direction in which the plunger 22 moves away from the core portion 32 by an elastic force of the coil spring 106 as the elastic member. In other words, the plunger 22 is pressed in a direction in which the lower end of the rod portion 66 of the plunger 22 comes near to the opening 52 (hereinafter, this direction is referred to as a "first direction", where appropriate). Additionally, in the blind hole 104, a bar-like stopper 108 is inserted in a state in which the stopper 108 is encircled by the coil spring 106. The stopper 108 restricts an amount of upward movement of the plunger 22.

The coil 24 is held by a plastic holding member 110 in an outer circumferential portion of the housing 20, and is covered together with the holding member 110 by a coil case 112 formed of ferromagnetic material. The coil case 112 is fixed at an upper end portion thereof to the core portion 32 of the closed-end cylindrical member 26 and at a lower end portion thereof to the ferromagnetic hollow cylindrical portion 38. Therefore, as the coil 24 generates magnetic field, a magnetic path will be created through the coil case 112, the core portion 32, the plunger 22, and the ferromagnetic hollow cylindrical portion 38.

2. Actuation of Electromagnetic Linear Valve

Because of the construction described above, the electromagnetic linear valve 10 is constituted so as to prohibit, when no electric current is supplied to the coil 24, a flow of the operating liquid from the high-pressure side operating liquid passage 12 to the low-pressure side operating liquid passage 14, and constituted so as to allow, when an electric current is supplied to the coil 24, the flow of the operating liquid from the high-pressure side operating liquid passage 12 to the low-pressure side operating liquid passage 14 and also to controllably vary the pressure difference, at the moment of allowing the flow of the operating liquid, between a liquid pressure of the operating liquid in the high-pressure side operating liquid passage 12 and a liquid pressure of the operating liquid in the low-pressure side operating liquid passage 14.

Detailed description is as follows. When no electric current is supplied to the coil 24, an edge of the rod portion 66 of the plunger 22 sits on the opening 52 of the through hole 50 connecting to the second liquid chamber 48 by the elastic force of the coil spring 106, and the electromagnetic linear valve 10 prohibits the flow of the operating liquid from the high-pressure side operating liquid passage 12 to the low-pressure side operating liquid passage 14. At this moment, a force F1 acts on the edge of the rod portion 66, and the force F1 is based on the pressure difference between a liquid pressure of the operating liquid in the high-pressure side operating liquid passage 12 (hereinafter, this liquid pressure is referred to as a "high-pressure side operating liquid pressure", where appropriate) and a liquid pressure of the operating liquid in the low-pressure side operating liquid passage 14 (hereinafter, this liquid pressure is referred to as a "low-pressure side operating liquid pressure", where appropriate). Though the force F1 based on the pressure difference and an elastic force F2 of the coil spring 108 act in opposite directions to each other, the elastic force F2 is somewhat larger than the force F1 based on the pressure difference. Therefore, the electromagnetic linear valve 10 is constituted not to open when no electric current is supplied to the coil 24.

On the other hand, when an electric current is supplied to the coil 24, magnetic field is generated and a magnetic flux passes through the coil case 112, the core portion 32, the plunger 22, the ferromagnetic hollow cylindrical portion 38, and the guide member 28. Then, a magnetic force is generated which makes the plunger 22 move in a direction in which the edge of the rod portion 66 separates from the opening 52 of the through hole 50 (hereinafter, this direction is referred to as a "second direction", where appropriate). Therefore, when the magnetic field is generated by the supply of an electric current to the coil 24, the total force of the force F1 based on the pressure difference and a force F3 which presses the plunger 22 upward by the magnetic force, and the elastic force F2 of the coil spring 108 act in opposite directions to each other. When the total force of the force F1 based on the pressure difference and the pressing force F3 by the magnetic force is larger than the elastic force F2, the edge of the rod portion 66 separates from the opening 52, whereby the operating liquid flows from the high-pressure side operating liquid passage 12 to the low-pressure side operating liquid passage 14. Then, since the operating liquid of the high pressure flows into the low-pressure side operating liquid passage 14, the low-pressure side operating liquid pressure increases and the force F1 based on the pressure difference decreases. When the force F1 based on the pressure difference decreases and thus the total force of the force F1 based on the pressure difference and the pressing force F3 by the magnetic force becomes smaller than the elastic force F2, the electromagnetic linear valve 10 closes and thus the flow of the operating liquid from the high-pressure side operating liquid passage 12 to the low-pressure side operating liquid passage 14 is prohibited. Accordingly, the low-pressure side operating liquid pressure is maintained at a pressure at the moment when the total force of the force F1 based on the pressure difference and the pressing force F3 by the magnetic force becomes smaller than the elastic force F2. That is, a control of an electric energy supplied to the coil 24 enables a control of the pressure difference between the low-pressure side operating liquid pressure and the high-pressure side operating liquid pressure, and enables an increase of the low-pressure side operating liquid pressure to a target operating liquid pressure.

Figure 3:
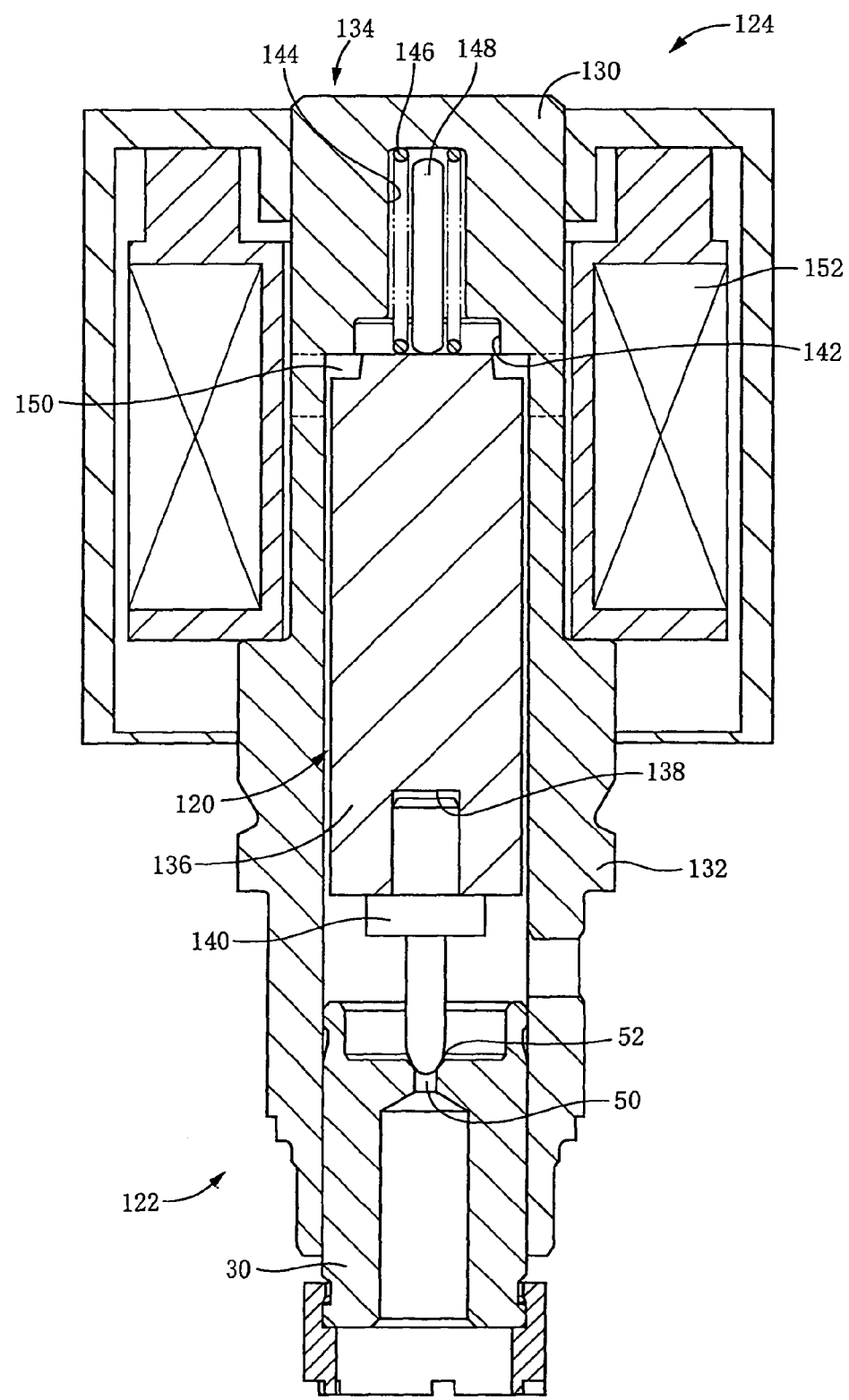
FIG. 3 is a schematic cross sectional view of an electromagnetic linear valve as a comparison example.

3. Comparison Between Electromagnetic Linear Valve According to the Invention and Other Electromagnetic Linear Valves In the electromagnetic linear valve 10, the plunger 22 has a stepped shape, and the housing 20 holding the plunger 22 has a stepped shape on the inside thereof. With respect to the electromagnetic linear valve 10 including the plunger 22 and the housing 20 each having a stepped shape, FIG. 3 shows an electromagnetic linear valve 124, as a comparative example, including a plunger 120 having a generally solid cylindrical shape, and a housing 122 whose inner diameter is uniform. The electromagnetic linear valve 124 of the comparative example has, except for the plunger 120 and the housing 122, a construction which is almost similar to that of the electromagnetic linear valve 10 according to the invention. Therefore, the following description centers on the plunger 120 and the housing 122, and, regarding components having similar functions, the same numerals are used and the descriptions are omitted or abbreviated.

The housing 122 included in the electromagnetic linear valve 124 of the comparative example has, as shown in FIG. 3, a closed-end cylindrical member 134 having a core portion 130 and a hollow cylindrical portion 132 constituting a wall surface. The closed-end cylindrical member 134 is integrally formed of a single material composed of ferromagnetic material, while an upper end portion of the hollow cylindrical portion 132, that is, a portion of the hollow cylindrical portion 132 continuing to the core portion 130 is non-magnetized by a laser processing. This portion is specified by a dotted line in FIG. 3. The inner diameter of the hollow cylindrical portion 132 of the closed-end cylindrical member 134 is uniform, and, in the hollow cylindrical portion 132, there is inserted the plunger 120 which has a plunger body 136 formed of ferromagnetic material and having a solid cylindrical shape. The outer diameter of the plunger body 136 is slightly smaller than the inner diameter of the hollow cylindrical portion 132 of the closed-end cylindrical member 134, and the plunger 120 is configured to be movable in the housing 122 along the axis of the plunger 120. Incidentally, the outer diameter of the plunger body 136 is almost equal to the outer diameter of the first solid cylindrical portion 72 of the plunger 22 included in the electromagnetic linear valve 10 according to the invention.

On a lower end face of the plunger body 136, a blind hole 138 is formed, and a rod member 140 is fixedly fitted in the blind hole 138. A lower end of the rod member 140 faces to the valve member 30 fitted in a lower end portion of the closed-end cylindrical member 134, and is constituted to sit on the opening 52 of the through hole 50 formed in the valve member 30. Additionally, a concave portion 142 is formed on a lower end face of the core portion 130, and a blind hole 144 is formed on a bottom face of the concave portion 142. In the blind hole 144, a coil spring 146 is inserted in a state in which it is pressed, and a stopper 148 is inserted in a state in which the stopper 148 is encircled by the coil spring 146. That is, the coil spring 146 and the stopper 148 are provided in a first plunger liquid chamber 150 defined by the core portion 130 and an upper end portion of the plunger body 136. It is noted that, in an outer circumferential face of the housing 122, a coil 152 which generates the magnetic field to move the plunger 120 upward against an elastic force of the coil spring 146.

Because of the construction described above, the electromagnetic linear valve 124 of the comparative example is constituted so as to close, like the electromagnetic linear valve 10 according to the invention, when no electric current is supplied to the coil 152, and constituted so as to allow, when an electric current is supplied to the coil 152, a flow of the operating liquid from a high-pressure side operating liquid passage to a low-pressure side operating liquid passage and also to controllably vary a pressure difference between a liquid pressure of the operating liquid in the high-pressure side operating liquid passage and a liquid pressure of the operating liquid in the low-pressure side operating liquid passage. In a comparison between the electromagnetic linear valve 124 of the comparative example and the electromagnetic linear valve 10 according to the invention, when the axis of the plunger 120 and the axis of the housing 122 are misaligned in a movement of the plunger, the plunger body 136 and the hollow cylindrical portion 132 of the closed-end cylindrical member 134 slidingly contact with each other in the electromagnetic linear valve 124 of the comparative example, and the slide contact portion 68 of the plunger 22 and the second fit-in portion 82 of the guide member 28 slidingly contact with each other in the electromagnetic linear valve 10 according to the invention, and thus a friction force generating between the plunger body 136 and the hollow cylindrical portion 132 tends to be larger than that generating between the contact portion 68 and the second fit-in portion 82.

More specifically, when an electric current is supplied to the coil 152 in the electromagnetic linear valve 124 of the comparative example, the magnetic field is generated and a magnetic flux passes through the housing 122, the plunger body 136, and the coil case 112. Magnetic field lines during the supply can be indicated as arrows in FIG. 4(a). This figure shows a state in which the axis of the plunger 120 and the axis of the housing 122 are misaligned, and thus the plunger body 136 contacts with the hollow cylindrical portion 132 of the housing 122 at a left side of the plunger body 136 shown in the figure. When the coil 152 is energized in this state and thus, for example, a magnetic flux corresponding to six magnetic field lines passes through an upper end of the plunger body 136, a magnetic flux corresponding to five magnetic field lines passes through a region of the plunger body 136 where the plunger body 136 and the hollow cylindrical portion 132 contact with each other, that is, the left side of the plunger body 136 shown in the figure, and a magnetic flux corresponding to one magnetic field line passes through a region of the plunger body 136 where the plunger body 136 and the hollow cylindrical portion 132 do not contact with each other, that is, a right side of the plunger body 136 shown in the figure. Therefore, a force corresponding to a difference between the magnetic flux passing through the region of the plunger body 136 where the plunger body 136 and the hollow cylindrical portion 132 contact with each other, and the magnetic flux passing through the region of the plunger body 136 where they do not, acts on the plunger 120. That is, a pull force based on a magnetic flux corresponding to four magnetic field lines generates between the plunger 120 and the hollow cylindrical portion 132, and thus a friction force depending on the pull force is generated.

Figure 4:
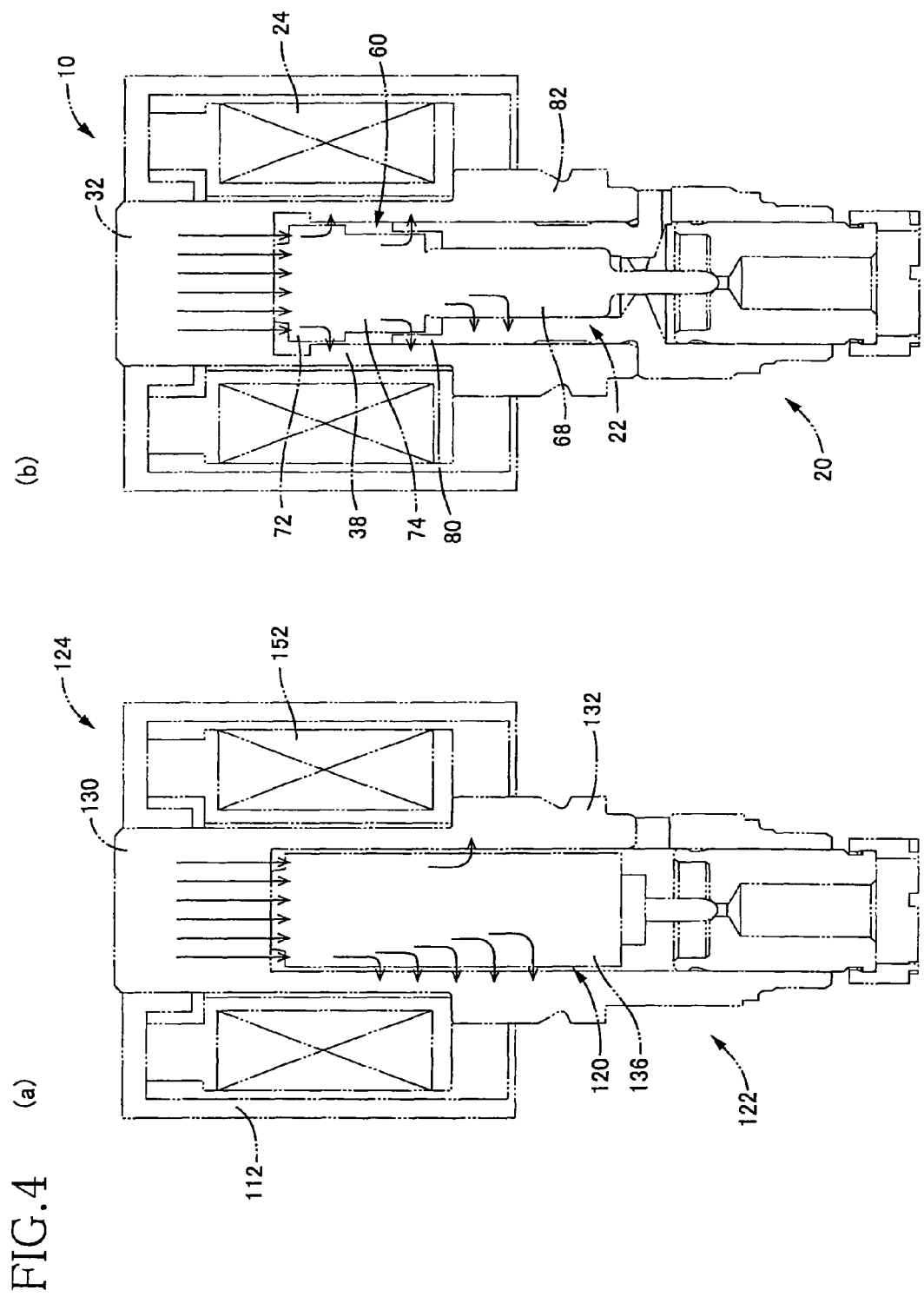
FIG. 4 shows the electromagnetic linear valve of FIG. 1 and the electromagnetic linear valve of the comparison example side by side.

On the other hand, magnetic field lines in energization of the coil 24 of the electromagnetic linear valve 10 according to the invention can be indicated as arrows in FIG. 4(b). This figure shows a state in which the axis of the plunger 22 and the axis of the housing 20 are misaligned, and thus the slide contact portion 68 of the plunger 22 contacts with the second fit-in portion 82 of the housing 20 in a left side of the slide contact portion 68 of the figure. When the coil 24 is energized in this state and thus, for example, a magnetic flux corresponding to six magnetic field lines passes from the core portion 32 to an upper end of the solid cylindrical member 60 of the plunger 22, a magnetic flux corresponding to only two magnetic field lines passes from the solid cylindrical member 60 of the plunger 22 to the slide contact portion 68. The reason is that, when the magnetic flux passes from the solid cylindrical member 60 to the slide contact portion 68, a cross section area of a portion where the magnetic flux passes sharply decreases, which causes a magnetic saturation in the slide contact portion 68. Therefore, the magnetic flux which cannot pass from the solid cylindrical member 60 to the slide contact portion 68 passes from the solid cylindrical member 60 to the housing 20 through the clearance therebetween. Specifically, between the first solid cylindrical portion 72 of the solid cylindrical member 60 and the ferromagnetic hollow cylindrical portion 38 of the housing 20, a magnetic flux corresponding to one magnetic field line passes in a left side of the first solid cylindrical portion 72 of the figure and a magnetic flux corresponding to one magnetic field line passes in a right side of the first solid cylindrical portion 72 of the figure. Additionally, between the second solid cylindrical portion 74 of the solid cylindrical member 60 and the first fit-in portion 80 of the housing 20, a magnetic flux corresponding to one magnetic field line passes in a left side of the second solid cylindrical portion 74 of the figure and a magnetic flux corresponding to one magnetic field line passes in a right side of the second solid cylindrical portion 74 of the figure. In the meantime, a magnetic flux corresponding to two magnetic field lines passing from the solid cylindrical member 60 to the slide contact portion 68 passes through a region of the slide contact portion 68 where the slide contact portion 68 and the second fit-in portion 82 of the housing 20 contact with each other (a left side of the slide contact portion 68 of the figure). Therefore, a pull force based on the magnetic flux corresponding to two magnetic field lines generates between the plunger 22 and the inner circumferential face of the housing 20, and thus a friction force depending on the pull force is generated between the slide contact portion 68 and the second fit-in portion 82.

Accordingly, when the same amount of a magnetic flux passes from the core portion of the housing to the plunger, the friction force generating between the plunger and the inner circumferential face of the housing can be less in the electromagnetic linear valve 10 according to the invention than in the electromagnetic linear valve 124 of the comparative example. The friction force between the plunger and the inner circumferential face of the housing will be generated even in no movement of the plunger and is a force which prevents a movement of the plunger. An electromagnetic linear valve is a valve which controls an upward force and a downward force acting on a plunger so as to control a pressure difference between a liquid pressure of an operating liquid in a high-pressure side operating liquid passage and a liquid pressure of an operating liquid in a low-pressure side operating liquid passage. Therefore, where a friction force which prevents a movement of the plunger is large, the control of the pressure difference may be influenced. For such a reason, the electromagnetic linear valve 10 can control the pressure difference between the liquid pressure in the high pressure side and the liquid pressure in the low pressure side more preferably than the electromagnetic linear valve 124 of the comparative example.

In addition, a force which prevents a movement of the plunger may be generated other than the above friction force. When a conductor moves in an environment in which a magnetic flux exists, an effect of electromagnetic induction generates a force which prevents the movement of the conductor, namely, an electromotive force. The electromotive force generated by electromagnetic induction becomes larger, as a moving speed of the conductor becomes higher. That is, no movement of the conductor generates no electromotive force. Therefore, even in an electromagnetic linear valve, when a plunger moves in a state in which a coil is energized and a magnetic flux passes through the plunger, a housing, and so on, the above electromotive force is generated. However, the electromotive force generated by electromagnetic induction is not generated in no movement of the plunger and is significantly small in a movement of the plunger at a low speed. Therefore, the influence on the control of the pressure difference can be considered small.

In an electromagnetic linear valve, there is a problem of a self-excited vibration in a control of a pressure difference. A self-excited vibration is a vibration of a plunger at the natural frequency depending on the spring constant of a coil spring which applies a force to the plunger, a fluid force of the operating liquid, an electromagnetic force, and the like. Such a vibration is not desirable. That is, restraining a self-excited vibration, in other words, damping a self-excited vibration is desired, and it is desirable to apply a large damping force for a self-excited vibration. Since the electromotive force generated by electromagnetic induction becomes larger as a moving speed of the conductor becomes higher, it is possible to preferably damp a self-excited vibration. The electromotive force generated by electromagnetic induction depends not only on a moving speed of the plunger but also on the amount of a magnetic flux passing through the plunger. That is, when the moving speed is uniform, an electromotive force is larger as the amount of a magnetic flux passing through the plunger is larger. Since the outer diameter of the first solid cylindrical portion 72 of the solid cylindrical member 60 of the plunger 22 of the electromagnetic linear valve 10 according to the invention is almost equal to the outer diameter of the plunger body 136 of the plunger 120 of the electromagnetic linear valve 124 of the comparative example, the amount of a magnetic flux passing through the plunger 22 is almost equal to the amount of a magnetic flux passing through the plunger 120. For such a construction, the electromagnetic linear valve 10 can damp a self-excited vibration by the electromotive force depending on electromagnetic induction in a degree equivalent to the electromagnetic linear valve 124 of the comparative example. That is, compared to the electromagnetic linear valve 124 of the comparative example, the electromagnetic linear valve 10 according to the invention can decrease the friction force between the plunger and the inner wall face of the housing without degrading the damping effect by the electromotive force depending on electromagnetic induction.

In addition, when the air bubbles are contained in the liquid chamber in which the plunger is housed, namely, the first liquid chamber 46, the damping effect by the operating liquid is degraded, whereby a self-excited vibration of the plunger becomes easy to occur. Therefore, it is desirable that the air bubbles contained in the first liquid chamber are ejected to the low-pressure side operating liquid passage 14. However, since a clearance which communicates with a liquid chamber defined by a core portion of a housing and an upper end portion of a plunger, and which is located between an outer circumferential face of a plunger and an inner Circumferential face of the housing is relatively small, it is difficult to eject the air bubbles from the liquid chamber. Then, in the electromagnetic linear valve 10 according to the invention, the liquid chamber defined by the core portion 32 and the upper end portion of the plunger 22, namely, the first plunger liquid chamber 86 has the volume larger than that of the first plunger liquid chamber 150 of the electromagnetic linear valve 124 of the comparative example, whereby the influence on the degradation of the damping effect due to the air bubbles is reduced.

Figure 5:
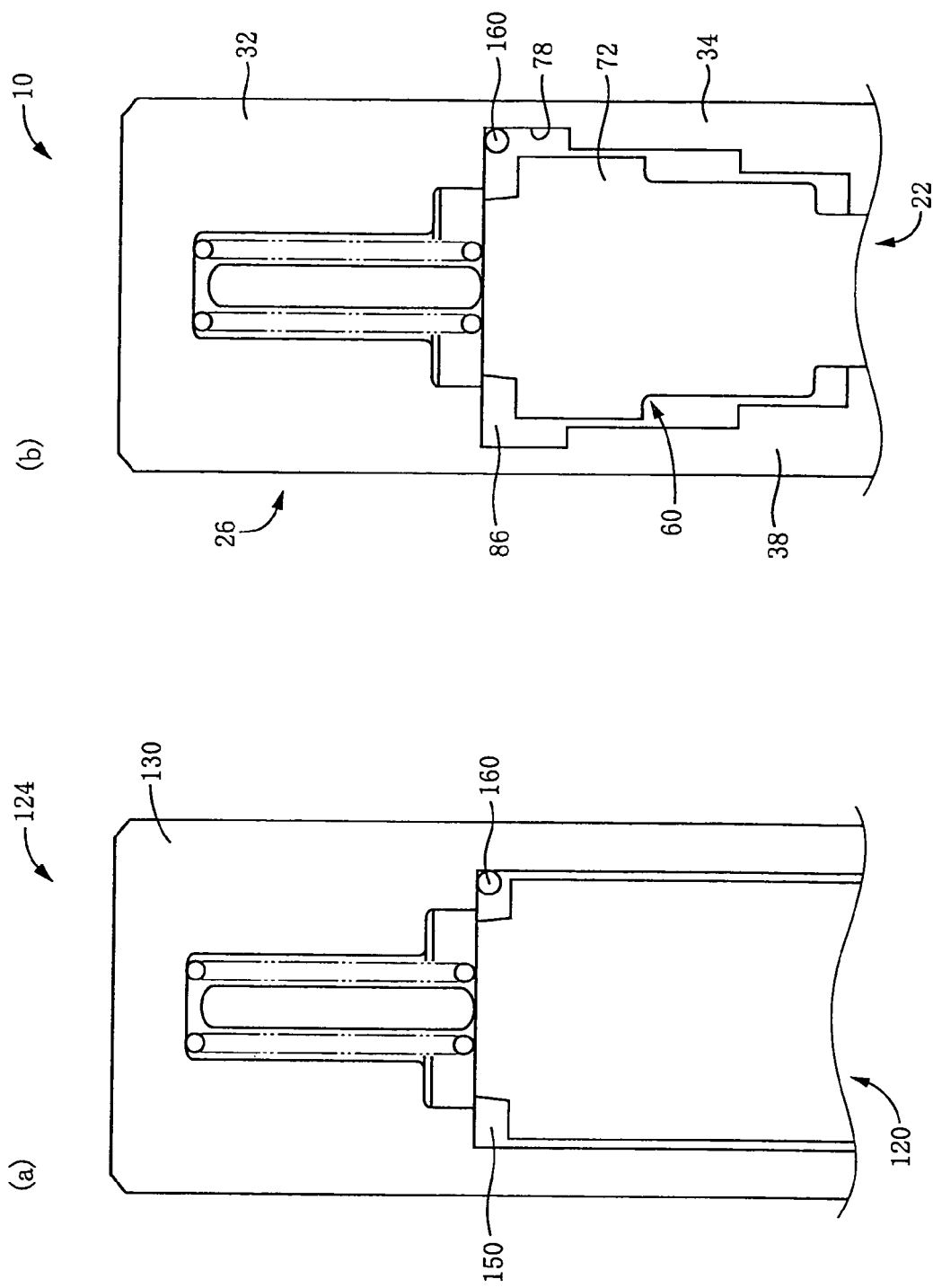
FIG. 5 shows an enlarged view of the electromagnetic linear valve of FIG. 1 and an enlarged view of the electromagnetic linear valve of the comparison example side by side.

In detail, in the electromagnetic linear valve 10, the recess 78 is formed in the upper end portion of the hollow cylindrical portion 34 of the closed-end cylindrical member 26 constituting the housing 20, that is, in a section of the inner circumferential portion of the hollow cylindrical portion 34, which the inner circumferential portion intersects with a lower end face of the core portion 32. Therefore, as shown in FIG. 5, the volume of the first plunger liquid chamber 86 of the electromagnetic linear valve 10 according to the invention is larger than the first plunger liquid chamber 150 of the electromagnetic linear valve 124 of the comparative example by a volume surrounded by the recess 78. Where the same amount of the air bubbles 160 is contained in each of the first plunger liquid chambers 86, 150, the percentage of the volume of the air bubbles 160 in the volume of the first plunger liquid chamber 86 of the electromagnetic linear valve 10 according to the invention is smaller than the percentage of the volume of the air bubbles 160 in the volume of the first plunger liquid chamber 150 of the electromagnetic linear valve 124 of the comparative example. Thus, even if air bubbles enter into the first plunger liquid chamber 86, the electromagnetic linear valve 10 according to the invention can reduce the influence on the degradation of the damping effect due to the air bubbles.

Figure 6:
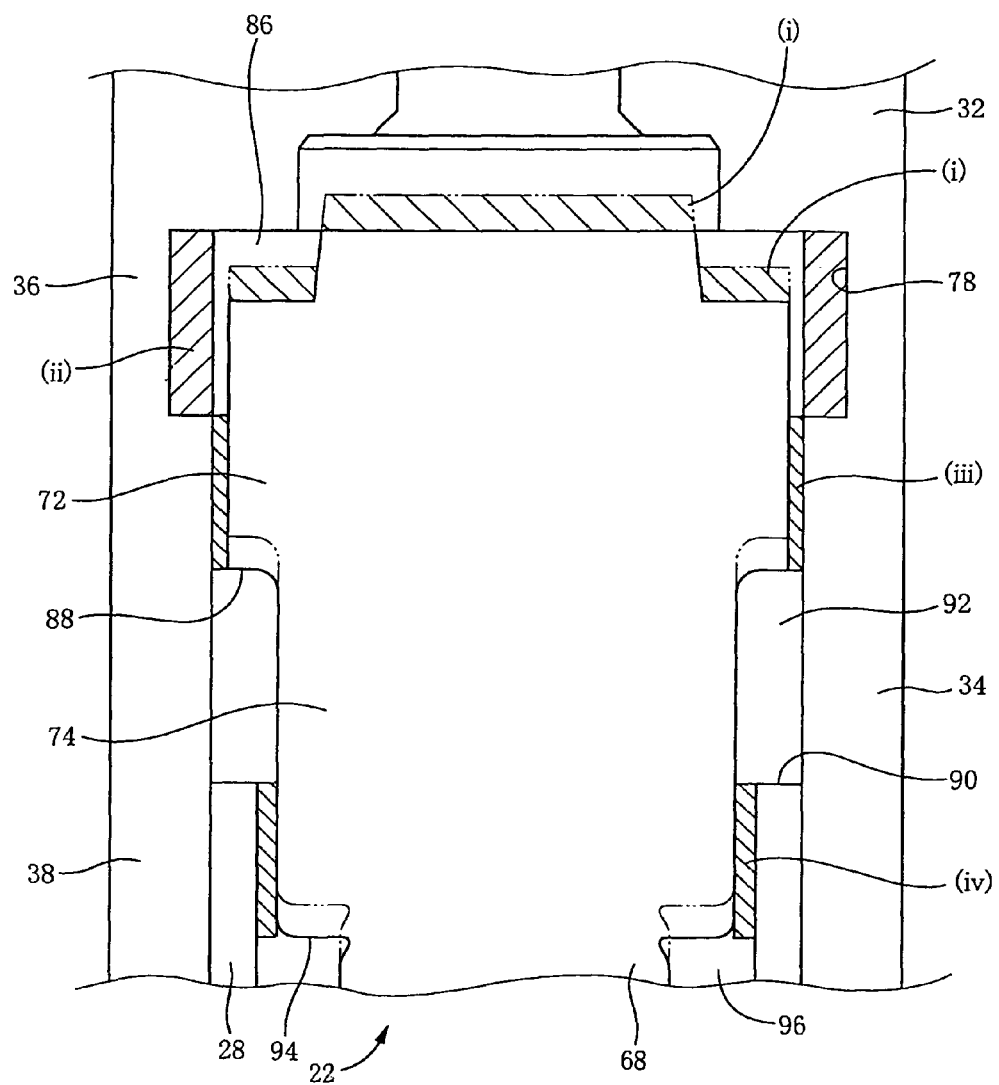
FIG. 6 shows an enlarged view of a large diameter portion of the electromagnetic linear valve of FIG. 1.

It is noted that a volume defined by the recess 78 formed in the hollow cylindrical portion 34 is larger than a decreased volume of the first plunger liquid chamber 86 resulting from a movement of the plunger 22. In detail, at a close of the valve, the edge of the plunger 22 sits on the opening of the through hole 50 and the plunger 22 is placed in a position indicated by a solid line in FIG. 6. Then, the plunger 22 is moved upward in connection with an energization of the coil 24, and the upper end portion of the plunger 22 enters into the first plunger liquid chamber 86, whereby the volume of the first plunger liquid chamber 86 is decreased. FIG. 6 shows, by an alternate long and two short dashes line, the plunger 22 in a state in which the plunger 22 is moved upward to the maximum, that is, a state in which the upper end portion of the plunger 22 is in the nearest position to the core portion 32, and shows, by a hatching of diagonal lines indicated by (i), the decreased volume amount in the movement, that is, an area corresponding to a remainder of subtracting the volume of the first plunger liquid chamber 86 in a state in which the plunger 22 is moved upward to the maximum from the volume of the first plunger liquid chamber 86 in a state in which the valve is closed. Hereinafter, this decreased volume amount is referred to as "maximum decrease amount", where appropriate. In addition, an area corresponding to the volume defined by the recess 78 is shown by a hatching of diagonal lines indicated by (ii). In the electromagnetic linear valve 10, the volume (ii) defined by the recess 78 is about three times larger than the maximum decrease volume amount (i). Therefore, even when the volume of the first plunger liquid chamber 86 decreases in connection with a movement of the plunger, the air bubbles in the first plunger liquid chamber is hard to influence the damping effect.

By the way, the air bubbles contained in the first plunger liquid chamber are frequently positioned in a periphery of the lower end face of the core portion, as shown in FIG. 5. When the plunger moves in this state, the air bubbles 160 are compressed, in the electromagnetic linear valve 124 of the comparative example, by the plunger 120 and the core portion 130, but are not compressed, in the electromagnetic linear valve 10 according to the invention, by the plunger 22 and the core portion 32 because the air bubbles 160 are positioned in the recess 78. The air bubbles are easier to be compressed than the operating liquid. Therefore, where the air bubbles are compressed by the plunger and the core portion in a movement of the plunger, the damping effect against the movement of the plunger is degraded. Thus, even if air bubbles enter into the first plunger liquid chamber 86, the electromagnetic linear valve 10 according to the invention can further reduce the influence on the degradation of the damping effect due to the air bubbles.

Moreover, since the recess 78 is formed in the hollow cylindrical portion 34, the electromagnetic linear valve 10 is constituted such that the volume of the clearance defined by the outer circumferential face of the solid cylindrical member 60 and the inner circumferential face of the ferromagnetic hollow cylindrical portion 38, more specifically, the volume of the clearance defined by the outer circumferential face of the first solid cylindrical portion 72 of the solid cylindrical member 60 and the inner circumferential face of the ferromagnetic hollow cylindrical portion 38 varies in connection with a movement of the plunger 22. In detail, as seen from FIG. 6, when the plunger 22 moves, the stepped face 88 between the first solid cylindrical portion 72 and the second solid cylindrical portion 74 moves upward or downward, but a stepped face between the non-magnetized hollow cylindrical portion 36 and the ferromagnetic hollow cylindrical portion 38, that is, a lower end of the recess 78 does not move. Therefore, the volume of a clearance which is defined by the outer circumferential face of the first solid cylindrical portion 72 and the inner circumferential face of the ferromagnetic hollow cylindrical portion 38, and which is located between the lower end of the recess 78 and the stepped face 88 as the first-direction stepped face varies in connection with a movement of the plunger 22. Hereinafter, this volume is referred to as a "first-solid-cylindrical-portion-hollow-cylindrical-portion-interposed volume", where appropriate.

This first-solid-cylindrical-portion-hollow-cylindrical-portion-interposed volume decreases in connection with an upward movement of the plunger 22 and increases in connection with a downward movement of the plunger 22. In the upward movement of the plunger 22, as described above, the volume of the first plunger liquid chamber 86 decreases, then the operating liquid of an amount corresponding to the decreased volume flows from the first plunger liquid chamber 86 into the second plunger liquid chamber 92. Therefore, in the upward movement of the plunger 22, the air bubbles contained in the first plunger liquid chamber 86 may flows into the second plunger liquid chamber 92 together with the operating liquid. In the electromagnetic linear valve 10, the first-solid-cylindrical-portion-hollow-cylindrical-portion-interposed volume which is the volume of the clearance connecting the first plunger liquid chamber 86 and the second plunger liquid chamber 92 decreases in connection with the upward movement of the plunger 22, whereby the air bubbles contained in the first plunger liquid chamber 86 at the upward movement of the plunger are easy to flow into the second plunger liquid chamber 92. In other words, in the upward movement of the plunger 22, the air bubbles contained in the first plunger liquid chamber 86 are easy to be ejected into the second plunger liquid chamber 92. On the other hand, in the downward movement of the plunger 22, the volume of the first plunger liquid chamber 86 increases, then the operating liquid of an amount corresponding to the increased volume flows from the second plunger liquid chamber 86 into the first plunger liquid chamber 92. Accordingly, the air bubbles may flow from the second plunger liquid chamber 92 into the first plunger liquid chamber 86. However, as described above, since the first-solid-cylindrical-portion-hollow-cylindrical-portion-interposed volume increases in the downward movement of the plunger 22, the air bubbles are hard to flow from the second plunger liquid chamber 92 into the first plunger liquid chamber 86.

Moreover, in the electromagnetic linear valve 10, the first-solid-cylindrical-portion-hollow-cylindrical-portion-interposed volume in a close of the valve is smaller than the decreased volume of the first plunger liquid chamber 86 in connection with a movement of the plunger 22, namely, the above maximum decrease amount, whereby the air bubbles contained in the first plunger liquid chamber 86 is easy to be ejected into the second plunger liquid chamber 92. In detail, when the plunger 22 moves upward to the maximum, the operating liquid of an amount corresponding to the maximum decrease amount flows from the first plunger liquid chamber 86 into the clearance between the outer circumferential face of the first solid cylindrical portion 72 and the inner circumferential face of the ferromagnetic hollow cylindrical portion 38, and then flows from this clearance into the second plunger liquid chamber 92. However, if the volume of the clearance, that is, the first-solid-cylindrical-portion-hollow-cylindrical-portion-interposed volume were larger than the maximum decrease amount, the air bubbles might flow from the first plunger liquid chamber 86 into the clearance together with the operating liquid but might not flow all the way into the second plunger liquid chamber 92. As a result, the air bubbles positioned in the clearance may be pulled back into the first plunger liquid chamber 86 again, when the plunger 22 moves downward. However, in the electromagnetic linear valve 10, since the first-solid-cylindrical-portion-hollow-cylindrical-portion-interposed volume in a close of the valve is smaller than the maximum decrease amount, the air bubbles will flow from the first plunger liquid chamber 86 through the clearance all the way into the second plunger liquid chamber 92 together with the operating liquid. Thus, according to the electromagnetic linear valve 10, the air bubbles can be easily ejected from the first plunger liquid chamber 86. Incidentally, an area corresponding to the first-solid-cylindrical-portion-hollow-cylindrical-portion-interposed volume in a close of the valve is shown by a hatching of diagonal lines indicated by (iii).

In the electromagnetic linear valve 10, in order to eject the air bubbles having been ejected into the second plunger liquid chamber 92 further into the third plunger liquid chamber 96, a volume of the clearance between the outer circumferential face of the second solid cylindrical portion 74 and the inner circumferential face of the guide member 28 in a close of the valve, more specifically, a volume of the clearance located between the stepped face 94 between the second solid cylindrical portion 74 and the slide contact portion 68, and the upper end face 90 of the guide member 28 as the second-direction stepped face is also smaller than the maximum decrease amount, like the above first-solid-cylindrical-portion-hollow-cylindrical-portion-interposed volume. Hereinafter, this volume is referred to as a "second-solid-cylindrical-portion-guide-member-interposed volume", where appropriate. Thus, according to the electromagnetic linear valve 10, the air bubbles in the first plunger liquid chamber 86 can be ejected into the third plunger liquid chamber 96 in connection with an upward movement of the plunger 22. In FIG. 6, an area corresponding to the second-solid-cylindrical-portion-guide-member-interposed volume in a close of the valve is shown by a hatching of diagonal lines indicated by (iv). It is noted that, since the notch portion 84 is formed in the guide member 28, the air bubbles in the third plunger liquid chamber 96 can be easily ejected through the notch portion 84 into the low-pressure side operating liquid passage 14.

By the way, where the first-solid-cylindrical-portion-hollow-cylindrical-portion-interposed volume is extremely small, the air bubbles in the second plunger liquid chamber 92 is easy to enter into the first plunger liquid chamber 86, and where the second-solid-cylindrical-portion-guide-member-interposed volume is extremely small, the air bubbles in the third plunger liquid chamber 96 is easy to enter into the second plunger liquid chamber 92. Thus, in the electromagnetic linear valve 10, as seen from FIG. 6, when the valve is opened to the maximum, the stepped face 88 (shown by an alternate long and two short dashes line) between the first solid cylindrical portion 72 and the second solid cylindrical portion 74 is positioned below the lower end of the recess 78, and the stepped face 94 (shown by an alternate long and two short dashes line), as the plunger stepped face, between the second solid cylindrical portion 74 and the slide contact portion 68 is positioned below the upper end face 90 of the guide member 28. Therefore, the first-solid-cylindrical-portion-hollow-cylindrical-portion-interposed volume and the second-solid-cylindrical-portion-guide-member-interposed volume are secured even in an open of the valve. Moreover, the first-solid-cylindrical-portion-hollow-cylindrical-portion-interposed volume at the moment when the valve is opened to the maximum is about 80 percent of the first-solid-cylindrical-portion-hollow-cylindrical-portion-interposed volume at a moment when the valve is closed, and the second-solid-cylindrical-portion-guide-member-interposed volume at the moment when the valve is opened to the maximum is about 80 percent of the second-solid-cylindrical-portion-guide-member-interposed volume at a moment when the valve is closed. That is, the volumes at the open of the valve are more than a half of the corresponding volumes at the close of the valve. Thus, according to the electromagnetic linear valve 10, the air bubbles in the second plunger liquid chamber 92 are hard to enter into the first plunger liquid chamber 86, and the air bubbles in the third plunger liquid chamber 96 is hard to be ejected into the second plunger liquid chamber 92. Incidentally, comparing, with the maximum decrease amount, the first-solid-cylindrical-portion-hollow-cylindrical-portion-interposed volume and the second-solid-cylindrical-portion-guide-member-interposed volume at a moment when the valve is opened, each of them is about a half of the maximum decrease amount.

Modified Embodiment

Figure 7:
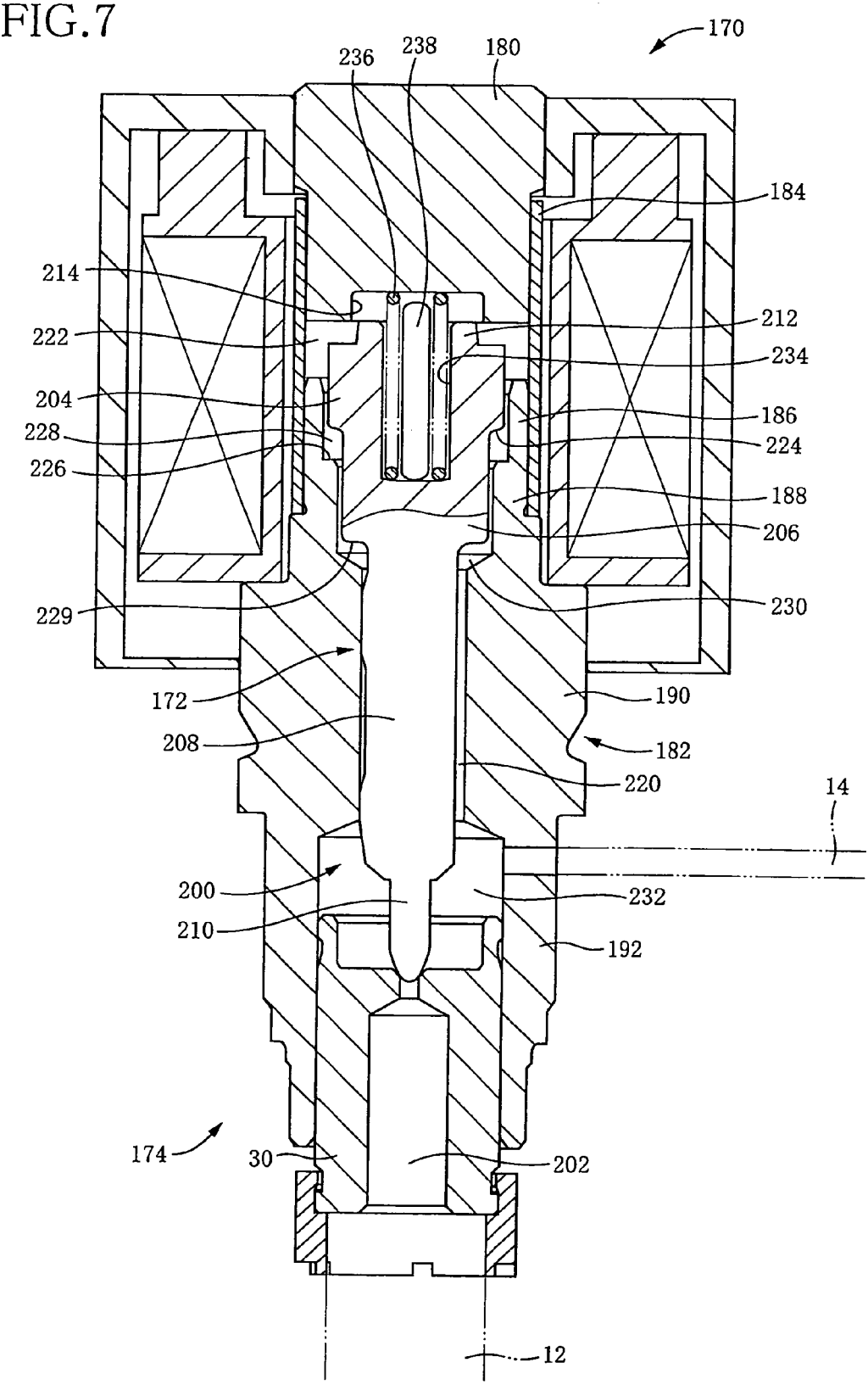
FIG. 7 is a schematic cross sectional view of an electromagnetic linear valve of an embodiment resulting from modifying the embodiment.

FIG. 7 shows an electromagnetic linear valve 170 of an embodiment modified from the above electromagnetic linear valve 10. The electromagnetic linear valve 170 of the modified embodiment has, except for the plunger 172 and the housing 174, a construction almost similar to that of the electromagnetic linear valve 10. Therefore, the following description centers on the plunger 172 and the housing 174, and, regarding components having similar functions, the same numerals are used and the descriptions are omitted or abbreviated.

A housing 174 provided in the electromagnetic linear valve 170 of the modified embodiment includes: a core 180 as the core portion provided in an upper end portion of the housing 174 and having a solid cylindrical shape; a hollow cylindrical member 182 constituting a wall face and having a generally hollow cylindrical shape; a connecting member 184 fitted around the core 180 and the hollow cylindrical member 182 and having a hollow cylindrical shape; and a valve member 30 fitted in an lower end portion of the hollow cylindrical member 182 and having a hollow cylindrical shape whose end is closed. The core 180 and the hollow cylindrical member 182 are each formed of ferromagnetic material, and are connected with each other via the connecting member 184 formed of nonmagnetic material and having a hollow cylindrical shape while separated from each other.

The hollow cylindrical member 182 includes an inside portion having a stepped shape and can be sectioned into: an upper end portion 186 being in an upper end portion of the cylindrical member 182; a first intermediate portion 188 being below the upper end portion 186 and having an inner diameter smaller than that of the upper end portion 186; a second intermediate portion 190 being below the first intermediate portion 188 and having an inner diameter smaller than that of the first intermediate portion 188; and a lower end portion 192 being in a lower end portion of the cylindrical member 182. In the lower end portion 192, the valve member 30 is fixedly fitted, and separates the inside of the housing 174 into a first liquid chamber 200 and a second liquid chamber 202. Incidentally, the first liquid chamber 200 is located above the valve member 30, and the second liquid chamber 202 is located below the valve member 30.

The plunger 172 is formed of ferromagnetic material and is disposed in the first liquid chamber 200 such that the plunger 172 is movable along an axis of the plunger 172. The plunger 172 is constituted by: a first solid cylindrical portion 204 having the largest outer diameter; a second solid cylindrical portion 206 being below the first solid cylindrical portion 204 and having an outer diameter smaller than that of the first solid cylindrical portion 204; a slide contact portion 208 being below the second solid cylindrical portion 206 and having an outer diameter smaller than that of the second solid cylindrical portion 206; and a rod portion 210 being below the slide contact portion 208 and having an outer diameter smaller than that of the slide contact portion 208, and therefore the plunger 172 has a stepped shape.

Regarding the plunger 172, the first solid cylindrical portion 204 is provided so as to face to the core 180 and inserted in the upper end portion 186 of the hollow cylindrical member 182, the second solid cylindrical portion 206 is inserted in the first intermediate portion 188, and the slide contact portion 208 is inserted in the second intermediate portion 190. The outer diameters of the first solid cylindrical portion 204, the second solid cylindrical portion 206, and the slide contact portion 208 of the plunger 172 are slightly larger than the inner diameters of the upper end portion 186, the first intermediate portion 188, and the second intermediate portion 190 of the hollow cylindrical member 182, respectively. Therefore, the plunger 172 is smoothly movable in the housing 174 along the axis of the plunger 172. In addition, a clearance between the slide contact portion 208 and the second intermediate portion 190 is smaller than any of that between the first solid cylindrical portion 204 and the upper end portion 186, and that between the second solid cylindrical portion 206 and the first intermediate portion 188. Therefore, where the axis of the plunger 172 and the axis of the housing 174 are misaligned, the plunger 172 and the housing 174 contact to each other only at the slide contact portion 208 as the small diameter portion and at the second intermediate portion 190 as the second inner diameter portion, that is, they do not contact to each other at a large diameter portion constituted by the first solid cylindrical portion 204 and the second solid cylindrical portion 206 and at a first inner diameter portion constituted by the upper end portion 186 and the first inner diameter portion 188. It is noted that a protruding portion 212 is formed on an upper end face of the first solid cylindrical portion 204 of the plunger 172, and that the protruding portion 212 is inserted in a concave portion 214 formed on a lower end face of the core 180.

In the second intermediate portion 190 in which the slide contact portion 208 is inserted, there is formed a notch portion 220 extending along the axis at a part of a circumferential portion of the second intermediate portion 190. This notch portion 220 allows the communication between two chambers in the first liquid chamber 200. In detail, the first liquid chamber 200 is constituted by: a first plunger liquid chamber 222, as the plunger-core-interposed liquid chamber, defined by the core portion 180 and an upper end portion of the plunger 172; a second plunger liquid chamber 228 defined by a stepped face 224 between the first solid cylindrical portion 204 and the second solid cylindrical portion 206, and a stepped face 226 between the upper end portion 186 and the first intermediate portion 188; a third plunger liquid chamber 230 defined by a stepped face 229 between the second solid cylindrical portion 206 and the slide contact portion 208, and a stepped face between the first intermediate portion 188 and the second intermediate portion 190; and a fourth plunger liquid chamber 232 defined by the lower end portion 192 and the valve member 30. The third plunger liquid chamber 230 and the fourth plunger liquid chamber 232 of those four liquid chambers 222, 228, 230, 232 communicate with each other through the notch portion 220. By the way, a lower end of the rod portion 210 of the plunger 172 located in the fourth plunger chamber 232 is constituted so as to face to the opening 52 of the through hole 50 formed in the valve member 30.

Additionally, on the upper end face of the plunger 172, a blind hole 234 is formed, and a coil spring 236 is fitted in the blind hole 234. An upper end portion of the coil spring 236 protrudes from the upper end face of the plunger 172. The coil spring 236 is disposed in a state in which it is compressed between a bottom face of the concave portion 214 and a bottom face of the blind hole 234. Therefore, the plunger 172 is pressed in a direction in which the plunger 172 moves away from the core 180 by an elastic force of the coil spring 106 as the elastic member. Additionally, in the blind hole 234, a bar-like stopper 238 is inserted in a state in which the stopper 238 is encircled by the coil spring 236.

By the construction described above, the electromagnetic linear valve 170 of the modified embodiment can decrease, like the above electromagnetic linear valve 10, the friction force between the plunger and the inner wall face of the housing while maintaining a damping effect of self-excited vibration by the electromotive force generated by electromagnetic induction. Additionally, in the electromagnetic linear valve 170 of the modified embodiment, a space defined by an upper end face of the hollow cylindrical member 182, an outer peripheral area of the lower end face of the core 180 facing to the former upper end face, and an inner circumferential face of the connecting member 184 serves like the recess 78 of the above electromagnetic linear valve 10, and the volume of the first plunger liquid chamber 222 is almost equal to the volume of the first plunger liquid chamber 86 of the above electromagnetic linear valve 10. Moreover, an amount corresponding to a remainder of subtracting the volume of the first plunger liquid chamber 222 in a state in which the plunger 172 is moved upward to the maximum from the volume of the first plunger liquid chamber 222 at a close of the valve is equal to the maximum decrease amount of the above electromagnetic linear valve 10. Furthermore, a clearance is defined by an outer circumferential face of the first solid cylindrical portion 204 and an inner circumferential face of the hollow cylindrical member 182, and the clearance is located between: a stepped face 224 being located between the first solid cylindrical portion 204 and the second solid cylindrical portion 206, as the first-direction stepped face, and the upper end face of the hollow cylindrical member 182. The volume of the clearance is equal to the first-solid-cylindrical-portion-hollow-cylindrical-portion-interposed volume of the above electromagnetic linear valve 10. And a clearance is defined by an outer circumferential face of the second solid cylindrical portion 206 and an inner circumferential face of the hollow cylindrical member 182, and the clearance is located between: a stepped face 229 being located between the second solid cylindrical portion 206 and the slide contact portion 208, as the plunger stepped face, and a stepped face 226 being, as the second-direction stepped face, between the upper end portion 186 and the first intermediate portion 188 of the hollow cylindrical member 182. The volume of the clearance is equal to the second-solid-cylindrical-portion-guide-member-interposed volume of the above electromagnetic linear valve 10. Therefore, in the electromagnetic linear valve 170 of the modified embodiment, like the above electromagnetic linear valve 10, the influence on the degradation of the damping effect due to the air bubbles is reduced, and the air bubbles in the first plunger liquid chamber 222 can be ejected into the third plunger liquid chamber 230 and further ejected through the notch portion 220 into the low-pressure side operating liquid passage 14, in connection with an upward movement of the plunger 22.

The invention claimed is:
1. An electromagnetic linear valve comprising:
a housing which includes a hollow cylindrical body portion, a core portion which closes an opening of one end portion of the body portion, a separation portion which separates an interior defined by the core portion and the body portion into a first liquid chamber located at one side of the separation portion nearer to the core portion and a second liquid chamber located at the other side of the separation portion, a through hole which passes through the separation portion so as to provide a communication between the first liquid chamber and the second liquid chamber, an outlet port which communicates with the first liquid chamber, and an inlet port which communicates with the second liquid chamber;
a plunger which is disposed in the first liquid chamber such that the plunger is movable along an axis in a state in which one end portion of the plunger faces to the core portion and the other end portion of the plunger faces to an opening of the thorough hole, the other end portion being allowed to sit on the opening as a valve body,
an elastic member which applies a force to the plunger in a first direction in which the one end portion of the plunger pulls away from the core portion and in which the other end portion of the plunger comes near to the opening, and
a coil which is disposed around the housing and generates magnetic field to move the plunger against the force of the elastic member in a second direction in which the one end portion of the plunger comes near to the core portion and in which the other end portion of the plunger pulls away from the opening,
wherein a recess is formed in a section of an inner circumferential portion of the body portion, the inner circumferential portion intersecting with an end face of the core portion, the end face being a face, in the first direction, nearer to the opening,
wherein a stepped face is formed on an outer circumferential portion of the one end portion of the plunger, whereby the plunger has a stepped shape in which an outer diameter of the one end portion is smaller in an end of the one end portion than in others of the one end portion,
wherein the core portion has a concave portion which is formed in an end thereof that is nearer to the opening in the first direction, and into which a portion of the plunger is inserted, the portion of the plunger being a portion, in the second direction, nearer to the core portion than the stepped face of the plunger, wherein the stepped face is placed, in the second direction along the axis, nearer to the core portion than an end of the recess which is an end nearer to the opening in the first direction in a state in which the other end portion of the plunger sits on the opening, wherein a first-direction stepped face is a stepping face facing in the first direction is formed on one of an outer circumferential portion of the plunger and the inner circumferential portion of the body portion in order that one of (a) an intermediate portion which is a portion between the one end portion and the other end portion of the plunger and (b) an internal portion of the body portion of the housing has a stepped shape, whereby a clearance between an outer circumferential face of the plunger and an inner circumferential face of the body portion is larger in a first section than in a second section, the first section being a section, in the first direction, nearer to the opening than the first-direction stepped face, the second section being a section, in the second direction, nearer to the core portion than the first-direction stepped face, wherein the first liquid chamber includes a plunger-core-interposed liquid chamber which is defined by the one end portion of the plunger and the core portion, and whose volume is reduced as the plunger moves in the second direction, and wherein the volume of a first space that is a part of a second space that is interposed between the outer circumferential portion of the plunger and the inner circumferential portion of the body portion is less than difference between the volume of the plunger-core-interposed liquid chamber in a state in which the other end portion of the plunger sits on the opening and the volume of the plunger-core-interposed liquid chamber in a state in which the plunger is placed in the farthest position thereof in the second direction, the first space being a space presenting between the first-direction steed face and the of the recess nearer to the opening in the first direction in a state in which the other end portion of the plunger sits on the opening.

2. The electromagnetic linear valve according to claim 1, wherein the recess is formed in a circular shape along the inner circumferential portion of the body portion.

3. The electromagnetic linear valve according to claim 1, wherein the core portion and at least a portion of the body portion are integrally formed of a single material composed of ferromagnetic material, the at least a portion of the body portion continuing to the core portion, wherein an end portion of the at least a portion of the body portion is non-magnetized, the at least a portion continuing to the core portion, and the end portion being nearer to the core portion, and wherein the recess is formed in an inner circumferential portion of the end portion.

4. The electromagnetic linear valve according to claim 1, wherein the core portion is constituted by a member composed of ferromagnetic material and having a solid cylindrical shape, wherein the body portion comprises (a) a hollow cylindrical member which is composed of ferromagnetic material and has a hollow cylindrical shape, and (b) a connecting member which is fitted around the core portion and the hollow cylindrical member so as to connect the core portion and the hollow cylindrical member in a state in which an end face of the core portion and an end face of the hollow cylindrical member are spaced apart from each other, the connecting member being composed of non-magnetic material, and wherein the recess is defined and formed by: the end face of the hollow cylindrical member; a portion of the end face, which faces to the end face of the hollow cylindrical member, of the core portion; and an inner circumferential face of the connecting member.

5. The electromagnetic linear valve according to claim 1, wherein the volume of the recess is not less than a difference between the volume of the plunger-core-interposed liquid chamber in a state in which the other end portion of the plunger sits on the opening and the volume of the plunger-core-interposed liquid chamber in a state in which the plunger is placed in the farthest position thereof in the second direction.

6. The electromagnetic linear valve according to claim 5, wherein the volume of the recess is not less than the double of a difference between the volume of the plunger-core-interposed liquid chamber in the state in which the other end portion of the plunger sits on the opening and the volume of the plunger-core-interposed liquid chamber in the state in which the plunger is placed in the farthest position thereof in the second direction.

7. The electromagnetic linear valve according to claim 1, wherein the first-direction stepped face is formed on the outer circumferential portion of the plunger, and the intermediate portion of the plunger has a stepped shape.

8. The electromagnetic linear valve according to claim 7, wherein the first-direction stepped face is placed, in the first direction along the axis, nearer to the opening than the end of the recess nearer to the opening in the first direction in a state in which the plunger is placed in the farthest position thereof in the second direction.

9. The electromagnetic linear valve according to claim 7, wherein the volume of the clearance which is present between the first-direction stepped face and the end of the recess nearer to the opening in the first direction in a state in which the plunger is placed in the farthest position thereof in the second direction, is not less than one third of a difference between the volume of the plunger-core-interposed liquid chamber in a state in which the other end portion of the plunger sits on the opening and the volume of the plunger-core-interposed liquid chamber in a state in which the plunger is placed in the farthest position thereof in the second direction.

10. An electromagnetic linear valve comprising:

a housing which includes a hollow cylindrical body portion, a core portion which closes an opening of one end portion of the body portion, a separation portion which separates an interior defined by the core portion and the body portion into a first liquid chamber located at one side of the separation portion nearer to the core portion and a second liquid chamber located at the other side of the separation portion, a through hole which passes through the separation portion so as to provide a communication between the first liquid chamber and the second liquid chamber, an outlet port which communicates with the first liquid chamber, and an inlet port which corn with the second liquid chamber;

a plunger which is disposed in the first liquid chamber such that the plunger is movable along an axis in a state in which one end portion of the plunger faces to the core portion and the other end portion of the plunger faces to an opening of the thorough hole, the other end portion being allowed to sit on the opening as a valve body;

an elastic member which applies a force to the plunger in a first direction in which the one end portion of the plunger pulls away from the core portion and in which the other end portion of the plunger comes near to the opening;

a coil which is disposed around the housing and generates magnetic field to move the plunger against the force of the elastic member in a second direction in which the one end portion of the plunger comes near to the core portion and in which the other end portion of the plunger pulls away from the opening, wherein a recess is formed in a section of an inner circumferential portion of the body portion, the inner circumferential portion intersecting with an end face of the core portion, the end face being a face, in the first direction, nearer to the opening, wherein a stepped face is formed on an outer circumferential portion of the one end portion of the plunger, whereby the plunger has a stepped shape in which an outer diameter of the one end portion is smaller in an end of the one end portion than in others of the one end portion, wherein the core portion has a concave portion which is formed in an end thereof that is nearer to the opening in the first direction, and into which portion of the plunger is inserted, the portion of the plunger being a portion, in the second direction, nearer to the core portion than the stepped face of the plunger, wherein the stepped face is placed, in the second direction along the axis, nearer to the core an end of the recess which is at end nearer to the in the first direction in a state in which the other end portion of the plunger sits on the opening, wherein a first-direction stepped face is a stepping face facing in the first direction is formed on one of an outer circumferential portion of the plunger and the inner circumferential portion of the body portion in order that one of (a) an intermediate which is a portion between the one end portion and the other end portion of the plunger and (b) an internal portion of the body portion of the housing has a stepped shape, whereby a clearance between an outer circumferential face of the plunger and an inner circumferential face of the body portion is larger in a first section than in a second section, the first section being a section, in the first direction, nearer to the opening than the first-direction stepped face, the second section being a section, in the second direction, nearer to the core portion than the first-direction stepped face, wherein a second-direction stepped face is formed on the other of the outer circumferential portion of the plunger and the inner circumferential portion of the body portion, the second-direction stepped face facing in the second direction so as to face to the first-direction stepped face, wherein the other of the intermediate portion of the plunger and the internal portion of the body portion of the housing also has a stepped shape, wherein a plunger stepped face facing in the first direction is formed on the outer circumferential portion of the plunger in order that the plunger has a stepped shape between the intermediate portion and the other end portion, wherein the first liquid chamber includes a plunger-core-interposed liquid chamber which is defined by the one end portion of the plunger and the core portion, and whose volume is reduced as the plunger moves in the second direction, and wherein the volume of a first space that is a part of a second space that is interposed between the outer circumferential portion of the plunger and the inner circumferential portion of the body portion is less than a difference between the volume of the plunger-core-interposed liquid chamber in a state in which the other end portion of the plunger sits on the opening and the volume of the plunger-core-interposed liquid chamber in a state in which the plunger is placed in the farthest position thereof in the second direction, the first space being a space presenting between the first-direction stepped face and the end of the recess nearer to the opening in the first direction in a state in which the other end portion of the plunger sits on the opening.

11. The electromagnetic linear valve according to claim 10, wherein the plunger comprises (a) a large diameter portion and (b) a small diameter portion, and a stepped face between the large diameter portion and the small diameter portion functions as the plunger stepped face, wherein the large diameter portion which is a portion, in the second direction, nearer to the core portion than the stepped face and which is composed of ferromagnetic material, and the small diameter portion which is a portion continuing to the large diameter portion, which is a portion, in the first direction, nearer to the opening than the stepped face, and which is composed of ferromagnetic material, wherein the body portion of the housing includes (a) a first inner diameter portion in which the large diameter portion is inserted and which is composed of ferromagnetic material, and (b) a second inner diameter portion which continues to the first inner diameter portion, whose inner diameter is shorter than that of the first inner diameter portion, in which the large diameter portion is inserted, and which is composed of ferromagnetic material, wherein, on one of an outer circumferential portion of the large diameter portion and the first inner diameter portion, the first-direction stepped face is formed, and, on the other of the outer circumferential portion of the large diameter portion and the first inner diameter portion, the second-direction stepped face is formed, and wherein the electromagnetic linear valve has a construction in which, when the plunger moves in the first liquid chamber, the small diameter portion and the second inner diameter portion slidably contact with each other while the plunger and the first inner diameter portion does not slidably contact with each other.

12. The electromagnetic linear valve according to claim 10, wherein the first-direction stepped face is formed on the outer circumferential portion of the plunger, and the second-direction stepped face is formed on the inner circumferential portion of the body portion.

13. The electromagnetic linear valve according to claim 12, wherein the plunger stepped face is placed, in the first direction along the axis, nearer to the opening than the second-direction stepping face in a state in which the plunger is placed in the farthest position thereof in the second direction.

14. The electromagnetic linear valve according to claim 12, wherein the first liquid chamber includes a plunger-core-interposed liquid chamber which is defined by the one end portion of the plunger and the core portion, and whose volume is reduced as the plunger moves in the second direction, and wherein the volume of the clearance which is present between the plunger stepped face and the second-direction stepped face in a state in which the plunger is placed in the farthest position thereof in the second direction, is not less than one third of a difference between the volume of the plunger-core-interposed liquid chamber in a state in which the other end portion of the plunger sits on the opening and the volume of the plunger-core-interposed liquid chamber in a state in which the plunger is placed in the farthest position thereof in the second direction.

15. An electromagnetic linear valve comprising:
a housing which includes a hollow cylindrical body portion, a core portion which closes an opening of one end portion of the body portion, a separation portion which separates an interior defined by the core portion and the body portion into a first liquid chamber located at one side of the separation portion nearer to the core portion and a second liquid chamber located at the other side of the separation portion, a through hole which passes through the separation portion so as to provide a communication between the first liquid chamber and the second liquid chamber, an outlet port which communicates with the first liquid chamber, and an inlet port which communicates with the second liquid chamber;
a plunger which is disposed in the first liquid chamber such that the plunger is movable along an axis in a state in which one end portion of the plunger faces to the core portion and the other end portion of the plunger faces to an opening of the thorough hole, the other end portion being allowed to sit on the opening as a valve body,
an elastic member which applies a force to the plunger in a first direction in which the one end portion of the plunger pulls away from the core portion and in which the other end portion of the plunger comes near to the opening, and
a coil which is disposed around the housing and generates magnetic field to move the plunger against the force of the elastic member in a second direction in which the one end portion of the plunger comes near to the core portion and in which the other end portion of the plunger pulls away from the opening,
wherein a recess is formed in a section of an inner circumferential portion of the body portion, the inner circumferential portion intersecting with an end face of the core portion, the end face being a face, in the first direction, nearer to the opening,
wherein a stepped face is formed on an outer circumferential portion of the one end portion of the plunger, whereby the plunger has a stepped shape in which an outer diameter of the one end portion is smaller in an end of the one end portion than in others of the one end portion,
wherein the core portion has a concave portion which is formed in an end thereof that is nearer to the opening in the first direction, and into which a portion of the plunger is inserted, the portion of the plunger being a portion, in the second direction, nearer to the core portion than the stepped face of the plunger,
wherein the stepped face is placed, in the second direction along the axis, nearer to the core portion than an end of the recess which is an end nearer to the opening in the first direction in a state in which the other end portion of the plunger sits on the opening,
wherein a first-direction stepped face is a stepping face facing in the first direction is formed on one of an outer circumferential portion of the plunger and the inner circumferential portion of the body portion in order that one of (a) an intermediate portion which is a portion between the one end portion and the other end portion of the plunger and (b) an internal portion of the body portion of the housing has a stepped shape, whereby a clearance between an outer circumferential face of the plunger and an inner circumferential face of the body portion is larger in a first section than in a second section, the first section being a section, in the first direction, nearer to the opening than the first-direction stepped face, the second section being a section, in the second direction, nearer to the core portion than the first-direction stepped face,
wherein the first-direction stepped face is formed on the outer circumferential portion of the plunger, and the intermediate portion of the plunger has a stepped shape,
wherein the first-direction stepped face is placed, in the first direction along the axis, nearer to the opening than the end of the recess nearer to the opening in the first direction in a state in which the plunger is placed in the farthest position thereof in the second direction.

\* \* \* \* \*